US010277915B2

(12) United States Patent
Joshi et al.

(10) Patent No.: US 10,277,915 B2
(45) Date of Patent: Apr. 30, 2019

(54) SIGNALING QUANTIZATION MATRICES FOR VIDEO CODING

(71) Applicant: Qualcomm Incorporated, San Diego, CA (US)

(72) Inventors: Rajan Laxman Joshi, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1005 days.

(21) Appl. No.: 13/670,011

(22) Filed: Nov. 6, 2012

(65) Prior Publication Data
US 2013/0114695 A1 May 9, 2013

Related U.S. Application Data

(60) Provisional application No. 61/556,785, filed on Nov. 7, 2011, provisional application No. 61/594,885, filed on Feb. 3, 2012, provisional application No. 61/597,107, filed on Feb. 9, 2012, provisional application No. 61/605,654, filed on Mar. 1, 2012.

(51) Int. Cl.
| | |
|---|---|
| *H04N 19/18* | (2014.01) |
| *H04N 19/126* | (2014.01) |
| *H04N 19/157* | (2014.01) |
| *H04N 19/463* | (2014.01) |

(52) U.S. Cl.
CPC ......... *H04N 19/463* (2014.11); *H04N 19/126* (2014.11); *H04N 19/157* (2014.11); *H04N 19/18* (2014.11)

(58) Field of Classification Search
CPC ..... H04N 7/26; H04N 1/32165; H04N 19/124
USPC ......... 375/240.01–240.29, E07.139, E07.214
See application file for complete search history.

(56) References Cited

U.S. PATENT DOCUMENTS

| | | | | |
|---|---|---|---|---|
| 5,489,943 | A | * | 2/1996 | Kutner ................ H04N 19/172 348/700 |
| 5,570,203 | A | * | 10/1996 | Suzuki .................. H04N 19/60 375/240.18 |
| 5,629,780 | A | | 5/1997 | Watson |
| 5,708,732 | A | * | 1/1998 | Merhav ................ G06T 3/4084 375/240.11 |

(Continued)

FOREIGN PATENT DOCUMENTS

| | | |
|---|---|---|
| CN | 1259830 A | 7/2000 |
| CN | 1681325 A | 10/2005 |

(Continued)

OTHER PUBLICATIONS

Kobayashi, M., and M. Shima, Sub-LCU level delta QP signaling, Joint Collaborative Team on Video Coding (JCT-VC) of ITU-T SG16 WP3 and ISO/IEC JTC1/SC29/WG11, 5th Meeting: Geneve, CH, Mar. 16-23, 2011*

(Continued)

*Primary Examiner* — Mohammed S Rahaman
*Assistant Examiner* — Richard A Hansell, Jr.
(74) *Attorney, Agent, or Firm* — Shumaker & Sieffert, P.A.

(57) ABSTRACT

The techniques of this disclosure may be generally related to signaling values of a quantization matrix. In some examples, coefficient values in the quantization matrix may be downsampled with different factors based on where the coefficient values are located in the quantization matrix.

29 Claims, 10 Drawing Sheets

Non-uniform sampling for a 16×16 quantization matrix

(56) References Cited

U.S. PATENT DOCUMENTS

| | | | | |
|---|---|---|---|---|
| 5,923,787 | A * | 7/1999 | Hara | G06T 9/005 358/426.14 |
| 6,487,249 | B2 | 11/2002 | Kim et al. | |
| 6,771,703 | B1 | 8/2004 | Oguz et al. | |
| 7,123,655 | B2 | 10/2006 | Kerofsky | |
| 7,254,174 | B2 * | 8/2007 | Pau | H04N 19/48 375/240.01 |
| 7,365,748 | B2 * | 4/2008 | Suen | G06T 3/4023 345/428 |
| 7,676,106 | B2 | 3/2010 | Panusopone et al. | |
| 8,948,270 | B2 | 2/2015 | Raveendran | |
| 8,964,828 | B2 | 2/2015 | Raveendran et al. | |
| 2002/0196854 | A1 * | 12/2002 | Kim | H04N 19/53 375/240.17 |
| 2003/0067980 | A1 * | 4/2003 | Shen | H04N 19/176 375/240.03 |
| 2005/0058204 | A1 * | 3/2005 | Fernandes | H04N 19/40 375/240.16 |
| 2008/0181521 | A1 * | 7/2008 | Kim | G06T 3/4084 382/250 |
| 2009/0226106 | A1 | 9/2009 | Choi et al. | |
| 2010/0074518 | A1 * | 3/2010 | Tanizawa | H04N 19/147 382/166 |
| 2010/0091842 | A1 * | 4/2010 | Ikeda | H04N 19/176 375/240.03 |
| 2011/0026761 | A1 * | 2/2011 | Radhakrishnan | G06F 17/30799 382/100 |
| 2011/0110423 | A1 | 5/2011 | Kadono et al. | |
| 2011/0274162 | A1 * | 11/2011 | Zhou | H04N 19/176 375/240.03 |
| 2012/0140815 | A1 * | 6/2012 | Zhou | H04N 19/117 375/240.03 |
| 2012/0230422 | A1 * | 9/2012 | Korodi | H04N 19/463 375/240.18 |
| 2013/0272391 | A1 * | 10/2013 | Zheng | H04N 19/463 375/240.03 |
| 2014/0177728 | A1 * | 6/2014 | Zhang | H04N 19/197 375/240.18 |
| 2014/0301449 | A1 * | 10/2014 | Oh | H04N 19/176 375/240.03 |
| 2015/0078442 | A1 | 3/2015 | Lim et al. | |
| 2015/0117523 | A1 | 4/2015 | Oh et al. | |
| 2015/0189275 | A1 | 7/2015 | Oh et al. | |

FOREIGN PATENT DOCUMENTS

| | | | |
|---|---|---|---|
| JP | 2014534749 A | 12/2014 | |
| JP | 2014534751 A | 12/2014 | |
| JP | 2015516754 A | 6/2015 | |
| KR | 20110114607 | * 11/2011 | H04N 7/34 |
| RU | 2378790 C1 | 1/2010 | |
| TW | 201043038 A | 12/2010 | |
| WO | 2007038701 A1 | 4/2007 | |
| WO | 2008044511 A1 | 4/2008 | |
| WO | 2010022189 | 2/2010 | |
| WO | 2010022190 | 2/2010 | |
| WO | WO-2013032794 A1 * | 3/2013 | H04N 19/197 |
| WO | 2013157825 A1 | 10/2013 | |

OTHER PUBLICATIONS

Kobayashi, M., and M. Shima, Sub-LCU level delta QP signaling, Joint Collaborative Team on Video Coding (JCT-VC) of ITU-T SGI 6 WP3 and ISO/IEC JTC1/SC29/WG11,5th Meeting: Geneve, CH, Mar. 16-23, 2011.*

Kobayashi, M., and M. Shima, Sub-LCU level delta QP signaling, Joint Collaborative Team on Video Coding (JCT-VC) of ITU-T SGI 6 WP3 and ISO/IEC JTC1/SC29/WG11,5th Meeting: Geneve, CH, Mar. 16-23, 2011 (Year: 2011).*

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011,193 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 2011, JCTVC-G1103_d2, 214 pp.

International Search Report and Written Opinion—PCT/US2012/063943—ISA/EPO—Jan. 28, 2013, 14 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Lim et al., "Simplification on default quantization matrix signaling," JCTVC-1010 19th Meeting: Geneva, CH, Apr. 27-May 7, 2012, 7 pp.

Tanaka et al., "Quantization Matrix for HEVC," Document: JCTVC-E073, 5th Meeting: Geneva, CH, Mar. 16-23, 2011, 24 pp.

Tanaka et al., "Enhancement of quantization matrix coding for HEVC," JCTVC-F475, 6th Meeting, Torino, IT, Jul. 14-22, 2011, 11 pp.

Bross et al., "High efficiency video coding (HEVC) text specification draft 6," 7th Meeting: Geneva, CH, Nov. 21-30, 2011, JCTVC-H1003, 259 pp.

Bross et al., "High efficiency video coding (HEVC) text specification draft 7," 9th Meeting: Geneva, CH, Apr. 27-May 7, 2012, JCTVC-I1003_d21, 290 pp.

Bross et al., "High efficiency video coding (HEVC) text specification draft 8," 10th Meeting: Stockholm, SE, Jul. 11-20, 2012, JCTVC-J1003_d7, 261 pp.

Zheng et al., "Investigate of sub-sampling representation methods for quantization matrices," JCTVC-I0364, 9th Meeting: Geneva, CH, Apr. 27-May 7, 2012, 8 pp.

Zhou et al., "Compact representation of quantization matrices for HEVC," JCTVC-D024, 4th Meeting: Daegu, Korea, Jan. 20-28, 2011, 9 pp.

Zhou et al., "Further study on compact representation of quantization matrices," JCTVC-F085, 6th Meeting: Torino, IT, Jul. 14-22, 2011, 4 pp.

U.S. Appl. No. 13/649,836, by Rajan Joshi, filed Oct. 11, 2012.

Budagavi et al., "Delta QP signaling at sub-LCU level," Jan. 20-28, 2011; (The Joint Collaborative Team on 3D Video Coding Extension Development of ISO/IEC JTC1/SC29/WG11 and ITU-T SG.16); Document: JCTVC-D038, Jan. 19, 2011, 5 pp.

Bross et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

Liu, "Non-CE4: Handling large size quantization matrices," MPEG meeting; Feb. 1-10, 2012; San Jose, CA; (Motion Picture Expert Group or ISO/IEC JTC1/SC29/WG11), 1 pp.

Morigami, "CE4 subtest 2.1: Enhancements of HEVC quantization matrix," JCT-VC meeting; MPEG meeting; Feb. 1-10, 2012; San Jose, CA (Joint Collaborative Team on Video Coding of ITU-T SG16 WP3 and ISO/IEC JTC1/SC29/WG11), URL: http://wftp3.itu.int/av-arch/jctvcsite/, 1 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

* cited by examiner

Non-uniform sampling for a 16×16 quantization matrix

Non-uniform sampling for a 8x8 quantization matrix

Non-uniform sampling for a 16×16 quantization matrix

SIGNALING QUANTIZATION MATRICES FOR VIDEO CODING

This application claims the benefit of U.S. Provisional Application No. 61/556,785, filed Nov. 7, 2011, U.S. Provisional Application No. 61/594,885, filed Feb. 3, 2012, U.S. Provisional Application No. 61/597,107, filed Feb. 9, 2012, and U.S. Provisional Application No. 61/605,654 filed Mar. 1, 2012, the entire contents of each of which are incorporated herein by reference.

TECHNICAL FIELD

This disclosure relates to data coding and, more particularly, to techniques for coding video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques include spatial prediction and/or temporal prediction to reduce or remove redundancy inherent in video sequences. For block-based video coding, a video frame or slice may be partitioned into blocks. Each block can be further partitioned. Blocks in an intra-coded (I) frame or slice are encoded using spatial prediction with respect to reference samples in neighboring blocks in the same frame or slice. Blocks in an inter-coded (P or B) frame or slice may use spatial prediction with respect to reference samples in neighboring blocks in the same frame or slice or temporal prediction with respect to reference samples in other reference frames. Spatial or temporal prediction results in a predictive block for a block to be coded. Residual data represents pixel differences between the original block to be coded and the predictive block.

An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in a particular order to produce a one-dimensional vector of transform coefficients for entropy coding.

SUMMARY

In general, this disclosure describes signaling values of a quantization matrix. For example, a video encoder may divide values of a quantization matrix into at least a first subset of values and a second subset of values. The video encoder may encode and signal the values of the first subset as syntax elements. The video decoder may receive the syntax elements for the values of the first subset and decode the syntax elements to generate the values of the first subset. Without receiving the values of the second subset, the video decoder may predict the values of the second subset from the values in the first subset.

In one example of the disclosure, a method of encoding video data comprises generating a quantization matrix that includes a plurality of values, downsampling a first set of values in the quantization matrix by a first downsampling factor to generate a first set of downsampled values, downsampling a second set of values in the quantization matrix by a second downsampling factor to generate a second set of downsampled values, and generating a coded bitstream that includes the first set of downsampled values and the second set of downsampled values.

In another example of the disclosure, a method of decoding video data comprises receiving a quantization matrix coded with downsampled values in a coded bitstream, upsampling a first set of downsampled values in the quantization matrix by a first upsampling factor to generate a first set of values, upsampling a second set of downsampled values in the quantization matrix by a second upsampling factor to generate a second set of values, and inverse quantizing a block of transform coefficients with the first and second set of values.

The details of one or more examples are set forth in the accompanying drawings and the description below. Other features, objects, and advantages will be apparent from the description and drawings, and from the claims.

DETAILED DESCRIPTION

Figure 1:
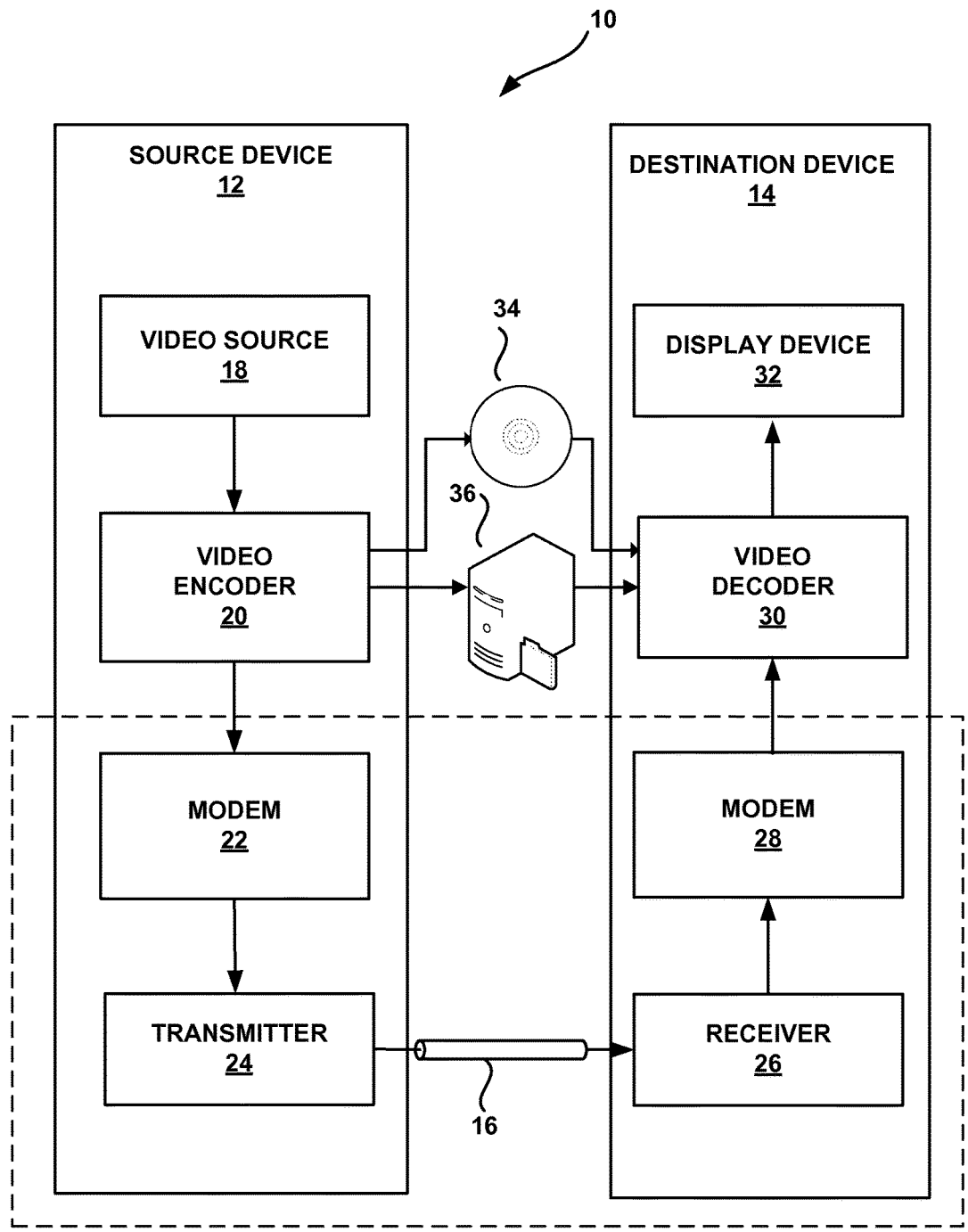
FIG. 1 is a block diagram illustrating an example video encoding and decoding system that may utilize the techniques described in this disclosure.

This disclosure describes techniques for signaling the values of a quantization matrix in video coding. A quantization matrix may be a 2-dimensional matrix that includes a plurality of values. As an illustration, a quantization matrix may be used to scale a quantization step size used for quantizing residual transform coefficients associated with a transform unit for video coding. A quantization parameter (QP) may be assigned to a block of transform coefficients, such as a transform unit, to specify a quantization step size. Each value in the quantization matrix corresponds to a coefficient in the block to be quantized, and is used to determine the degree of quantization to be applied to the coefficient, given the QP value.

In particular, this disclosure proposes techniques for downsampling a quantization matrix so that fewer quantization values need be transmitted and/or stored in an encoded video bitstream. Transmitting or storing entire quantization matrices associated with blocks of video data may require a large number of bits, thus reducing the bandwidth efficiency of the coded video bitstream. Also, a video decoder may store the entire quantization matrix in memory for an inverse quantization process. By downsampling a quantization matrix with the techniques of this disclosure, bits may be saved without substantially reducing the quality of the coded video.

In this disclosure, video coding will be described for purposes of illustration. The coding techniques described in this disclosure also may be applicable to other types of data coding. Digital video devices implement video compression techniques to encode and decode digital video information more efficiently. Video compression may apply spatial (intra-frame) prediction and/or temporal (inter-frame) prediction techniques to reduce or remove redundancy inherent in video sequences.

It should be understood that the term "frame" may be used interchangeably with the term "picture." In other words, the term "frame" and "picture" each refer to a portion of a video, and sequential display of the frame or picture results in smooth playback. Accordingly, in instances where the disclosure uses the term "frame," the techniques of this disclosure should not be construed as being limited to video coding techniques or standards that utilize the term "frame," and the techniques may be extendable to other standards, such as developed standards, standards under development, or future standards, or other video coding techniques that utilize the term "picture."

A typical video encoder partitions each frame of the original video sequence into contiguous rectangular regions called "blocks" or "coding units." These blocks are encoded in "intra mode" (I-mode), or in "inter mode" (P-mode or B-mode).

For P- or B-mode, the encoder first searches for a block similar to the one being encoded in a "reference frame," denoted by $F_{ref}$. Searches are generally restricted to being no more than a certain spatial displacement from the block to be encoded. When the best match, i.e., predictive block or "prediction," has been identified, it is expressed in the form of a two-dimensional (2D) motion vector ($\Delta x$, $\Delta y$), where $\Delta x$ is the horizontal and $\Delta y$ is the vertical displacement of the position of the pixels in the predictive block in the reference frame relative to the position of the pixels in the block to be coded.

The motion vectors together with the reference frame are used to construct predicted block $F_{pred}$ as follows:

$$F_{pred}(x,y)=F_{ref}(x+\Delta x,y+\Delta y)$$

The location of a pixel within the frame is denoted by (x, y).

For blocks encoded in I-mode, the predicted block is formed using spatial prediction from previously encoded neighboring blocks within the same frame. For both I-mode and P- or B-mode, the prediction error, i.e., the residual difference between the pixel values in the block being encoded and the predicted block, is represented as a set of weighted basis functions of some discrete transform, such as a discrete cosine transform (DCT). Transforms may be performed based on different sizes of blocks, such as 4×4, 8×8 or 16×16 and larger. The shape of the transform block is not always square. Rectangular shaped transform blocks can also be used, e.g. with a transform block size of 16×4, 32×8, etc.

The weights (i.e., the transform coefficients) are subsequently quantized. Quantization introduces a loss of information, and as such, quantized coefficients have lower precision than the original transform coefficients. Quantized transform coefficients and motion vectors are examples of "syntax elements." These syntax elements, plus some control information, form a coded representation of the video sequence. Syntax elements may also be entropy coded, thereby further reducing the number of bits needed for their representation. Entropy coding is a lossless operation aimed at minimizing the number of bits required to represent transmitted or stored symbols (in our case syntax elements) by utilizing properties of their distribution (some symbols occur more frequently than others).

The compression ratio, i.e., the ratio of the number of bits used to represent the original sequence and the compressed one, may be controlled by adjusting one or both of the value of the quantization parameter (QP) and the values in a quantization matrix, both of which may be used to quantize transform coefficient values. The compression ratio may depend on the method of entropy coding employed. Quantization matrices are typically designed such that the quantization values in the matrix generally, but not necessarily without exception, increase both in the row (left to right) and column (top to bottom) directions. For example, as a block of transform coefficients extends from a DC position in the upper left (0, 0) corner to higher frequency coefficients toward the lower right (n, n) corner of the block of transform coefficients, the corresponding values in the quantization matrix generally increase. The reason for such a design is that the contrast sensitivity function (CSF) of the human visual system (HVS) decreases with increasing frequency, both in horizontal and vertical directions.

In the decoder, the block in the current frame is obtained by first constructing its prediction in the same manner as in the encoder, and by adding to the prediction the compressed prediction error. The compressed prediction error is found by weighting the transform basis functions using the quantized coefficients. The difference between the reconstructed frame and the original frame is called reconstruction error.

FIG. 1 is a block diagram illustrating an example video encoding and decoding system 10 that may utilize the techniques described in this disclosure. As shown in FIG. 1, system 10 includes source device 12 that transmits encoded video to destination device 14 via communication channel 16. Encoded video data may also be stored on storage medium 34 or file server 36 and may be accessed by destination device 14 as desired. When stored to a storage medium or file server, video encoder 20 may provide coded video data to another device, such as a network interface, a compact disc (CD), Blu-ray or digital video disc (DVD) burner or stamping facility device, or other devices, for storing the coded video data to the storage medium. Likewise, a device separate from video decoder 30, such as a network interface, CD or DVD reader, or the like, may retrieve coded video data from a storage medium and provided the retrieved data to video decoder 30.

Source device 12 and destination device 14 may comprise any of a wide variety of devices, including desktop computers, notebook (i.e., laptop) computers, tablet computers, set-top boxes, telephone handsets such as so-called smartphones, televisions, cameras, display devices, digital media players, video gaming consoles, or the like. In many cases, such devices may be equipped for wireless communication. Hence, communication channel 16 may comprise a wireless channel, a wired channel, or a combination of wireless and wired channels suitable for transmission of encoded video data. Similarly, file server 36 may be accessed by destination device 14 through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server.

Techniques for signaling quantization matrices, in accordance with examples of this disclosure, may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, modulator/demodulator 22 and transmitter 24. In source device 12, video source 18 may include a source such as a video capture device, such as a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications, or application in which encoded video data is stored on a local disk.

The captured, pre-captured, or computer-generated video may be encoded by video encoder 20. The encoded video information may be modulated by modem 22 according to a communication standard, such as a wireless communication protocol, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

The captured, pre-captured, or computer-generated video that is encoded by video encoder 20 may also be stored onto storage medium 34 or file server 36 for later consumption. Storage medium 34 may include Blu-ray discs, DVDs, CD-ROMs, flash memory, or any other suitable digital storage media for storing encoded video. The encoded video stored on the storage medium 34 may then be accessed by destination device 14 for decoding and playback. Although not shown in FIG. 1, in some examples, storage medium 34 and/or file server 36 may store the output of transmitter 24.

File server 36 may be any type of server capable of storing encoded video and transmitting that encoded video to destination device 14. Example file servers include a web server (e.g., for a website), an FTP server, network attached storage (NAS) devices, a local disk drive, or any other type of device capable of storing encoded video data and transmitting it to a destination device. The transmission of encoded video data from file server 36 may be a streaming transmission, a download transmission, or a combination of both. File server 36 may be accessed by destination device 14 through any standard data connection, including an Internet connection. This may include a wireless channel (e.g., a Wi-Fi connection), a wired connection (e.g., DSL, cable modem, Ethernet, USB, etc.), or a combination of both that is suitable for accessing encoded video data stored on a file server.

Destination device 14, in the example of FIG. 1, includes receiver 26, modem 28, video decoder 30, and display device 32. Receiver 26 of destination device 14 receives information over channel 16, and modem 28 demodulates the information to produce a demodulated bitstream for video decoder 30. The information communicated over channel 16 may include a variety of syntax information generated by video encoder 20 for use by video decoder 30 in decoding video data. Such syntax may also be included with the encoded video data stored on storage medium 34 or file server 36. Each of video encoder 20 and video decoder 30 may form part of a respective encoder-decoder (CODEC) that is capable of encoding or decoding video data.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as the high efficiency video coding standard (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

For video coding according to the emerging HEVC standard currently under development by the Joint Cooperative Team for Video Coding (JCT-VC), as one example, a video frame may be partitioned into coding units. A coding unit (CU) generally refers to an image region that serves as a basic unit to which various coding tools are applied for video compression. A CU usually has a luminance component, denoted as Y, and two chroma components, denoted as U and V. Depending on the video sampling format, the size of the U and V components, in terms of number of samples, may be the same as or different from the size of the Y component. A CU is typically square, and may be considered to be similar to a so-called macroblock, e.g., under other video coding standards such as ITU-T H.264. Coding according to some of the presently proposed aspects of the developing HEVC standard will be described in this application for purposes of illustration. However, the techniques described in this disclosure may be useful for other video coding processes, such as those defined according to H.264 or other standard or proprietary video coding processes.

HEVC standardization efforts are based on a model of a video coding device referred to as the HEVC Test Model (HM). The HM presumes several capabilities of video coding devices over devices according to, e.g., ITU-T H.264/AVC. For example, whereas H.264 provides nine intra-prediction encoding modes, HM provides as many as thirty-five intra-prediction encoding modes. A recent latest Working Draft (WD) of HEVC, and referred to as HEVC WD7 hereinafter, is available from http://phenix.int-evey.fr/jct/doc_end_user/documents/9_Geneva/wg11/JCTVC-I1003-v6.zip as of Oct. 30, 2012.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may implement any or all of the techniques of this disclosure for downsampling and signaling quantization matrices in a video coding process. Likewise, video decoder 30 may implement any or all of these techniques for upsampling quantization matrices in a video coding process. A video coder, as described in this disclosure, may refer to a video encoder or a video decoder. Similarly, a video coding unit may refer to a video encoder or a video decoder. Likewise, video coding may refer to video encoding or video decoding.

In one example of the disclosure, video encoder 20 may be configured to generate a quantization matrix that includes a plurality of values, downsample a first set of values in the quantization matrix by a first downsampling factor to generate a first set of downsampled values, downsample a second set of values in the quantization matrix by a second downsampling factor to generate a second set of downsampled values, and generate a coded bitstream that includes the first set of downsampled values and the second set of downsampled values. In some examples, the downsampling factor may be one, in which case, the values are coded directly without downsampling.

In another example of the disclosure, video decoder 30 may be configured to receive a quantization matrix coded with downsampled values in a coded bitstream, upsample a first set of downsampled values in the quantization matrix by a first upsampling factor to generate a first set of values, upsample a second set of downsampled values in the quantization matrix by a second upsampling factor to generate a second set of values, and inverse quantize a block of transform coefficients with the first and second set of values. In some examples, the upsampling factor may be one, in which case, the values are coded directly without upsampling.

Figure 2:
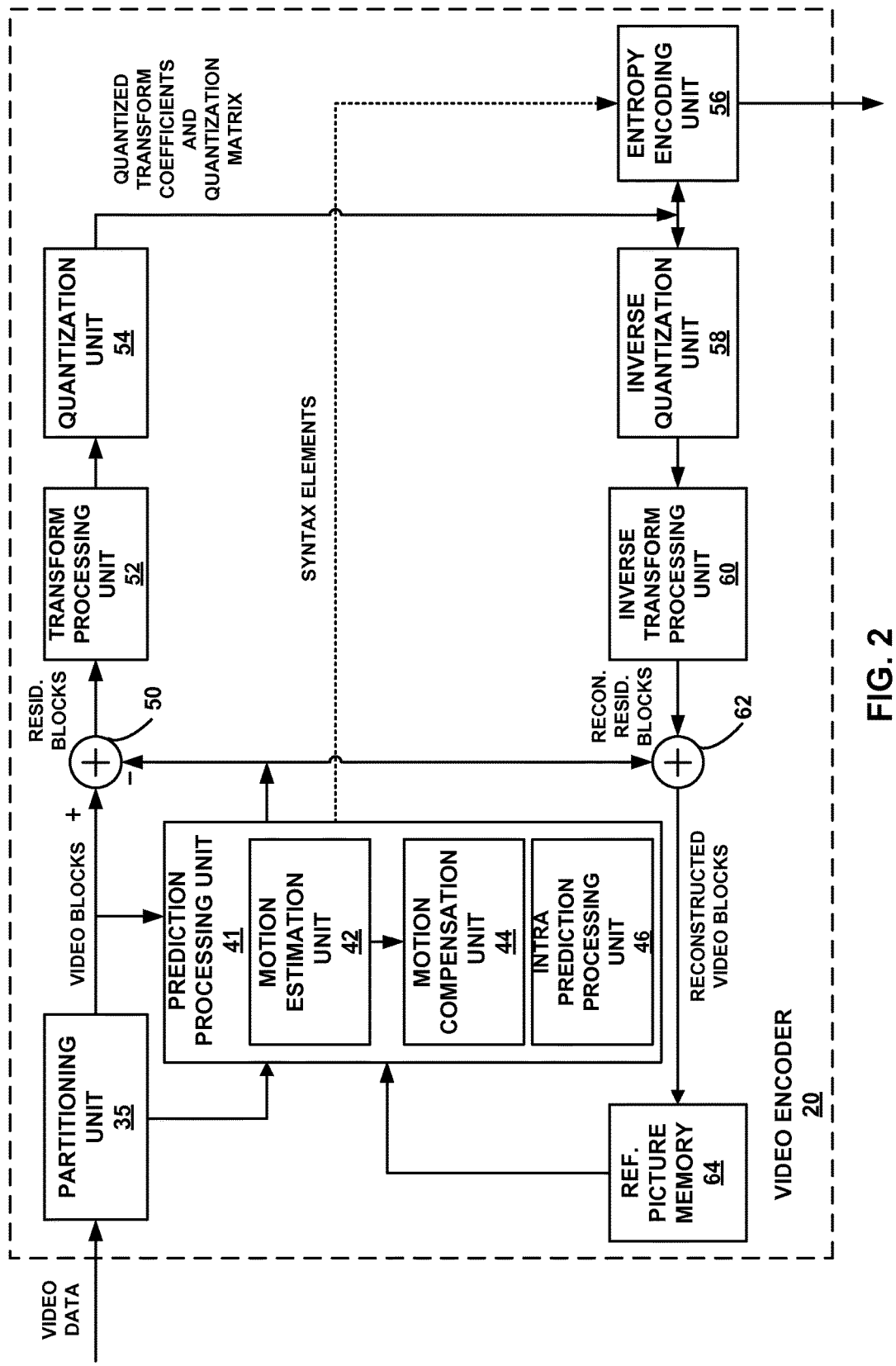
FIG. 2 is a block diagram illustrating an example video encoder that may implement the techniques described in this disclosure.

FIG. 2 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes a partitioning unit 35, prediction processing unit 41, reference picture memory 64, summer 50, transform processing unit 52, quantization unit 54, and entropy encoding unit 56. Prediction processing unit 41 includes motion estimation unit 42, motion compensation unit 44, and intra prediction processing unit 46. For video block reconstruction, video encoder 20 also includes inverse quantization unit 58, inverse transform processing unit 60, and summer 62. A deblocking filter (not shown in FIG. 2) may also be included to filter block boundaries to remove blockiness artifacts from reconstructed video. If desired, the deblocking filter would typically filter the output of summer 62. Additional loop filters (in loop or post loop) may also be used in addition to the deblocking filter.

As shown in FIG. 2, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 (or mode select unit 40, in some examples) may select an appropriate intra-prediction mode to use from the tested modes. For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy coding unit 56. Entropy coding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter or by modifying values in a quantization matrix. In some examples, quantization unit 54 may then perform a scan of the matrix including the quantized transform coefficients. Alternatively, entropy encoding unit 56 may perform the scan.

In some cases, quantization unit 54 may perform a post-transform scaling operation in addition to the quantization operation. The post-transform scaling operation may be used in conjunction with a core transform operation performed by transform unit 52 to effectively perform a complete space-to-frequency transform operation or an approximation thereof with respect to a block of residual data. In some examples, the post-transform scaling operation may be integrated with the quantization operation such that the post-transform operation and the quantization operation are performed as part of the same set of operations with respect to one or more transform coefficients to be quantized.

In some examples, quantization unit 54 may quantize transform coefficients based on a quantization matrix. The quantization matrix may include a plurality of values, each of which corresponds to a respective one of a plurality of transform coefficients in a transform coefficient block to be quantized. The values in the quantization matrix may be used to determine an amount of quantization to be applied by quantization unit 54 to corresponding transform coefficients in the transform coefficient block. For example, for each of the transform coefficients to be quantized, quantization unit 54 may quantize the respective transform coefficient according to an amount of quantization that is determined at least in part by a respective one of the values in the quantization matrix that corresponds to the transform coefficient to be quantized.

In further examples, quantization unit 54 may quantize transform coefficients based on a quantization parameter and a quantization matrix. The quantization parameter may be a block-level parameter (i.e., a parameter assigned to the entire transform coefficient block) that may be used to determine an amount of quantization to be applied to a transform coefficient block. In such examples, values in the quantization matrix and the quantization parameter may together be used to determine an amount of quantization to be applied to corresponding transform coefficients in the transform coefficient block. In other words, the quantization matrix may specify values that, with a quantization parameter, may be used to determine an amount of quantization to be applied to corresponding transform coefficients. For example, for each of the transform coefficients to be quantized in a transform coefficient block, quantization unit 54 may quantize the respective transform coefficient according to an amount of quantization that is determined at least in part by a block-level quantization parameter (QP) for the transform coefficient block and a respective one of a plurality of coefficient-specific values in the quantization matrix that corresponds to the transform coefficient to be quantized. Hence, the quantization matrix provides a corresponding value for each transform coefficient, and applies the value to the QP to determine the amount of quantization for the transform coefficient value.

In some examples, the quantization process may include a process similar to one or more of the processes proposed for HEVC and/or defined by the H.264 decoding standard. For example, in order to quantize the value (i.e., level) of a transform coefficient, quantization unit 54 may scale the transform coefficient by a corresponding value in the quantization matrix and by a post-transform scaling value. Quantization unit 54 may then shift the scaled transform coefficient by an amount that is based on the quantization parameter. In some cases, the post-transform scaling value may be selected based on the quantization parameter. Other quantization techniques may also be used.

Quantization unit 54 may, in some examples, cause data indicative of a quantization matrix used by quantization unit 54 for quantizing transform coefficients to be included in an encoded bitstream. For example, quantization unit 54 may provide data indicative of a quantization matrix to entropy encoding unit 56 for entropy encoding the data and subsequent placement in an encoded bitstream.

The quantization matrix data included in the encoded bitstream may be used by video decoder 30 for decoding the bitstream (e.g., for performing an inverse quantization operation). In some examples, the data may be an index value that identifies a predetermined quantization matrix from a set of quantization matrices, or may identify a function for generating a quantization matrix. In further examples, the data may include the actual values contained in the quantization matrix. In additional examples, the data may include a coded version of the actual values contained in the quantization matrix. For example, the coded version of the quantization matrix may include downsampled values for certain locations in the quantization matrix. In another example, the coded version may be generated based on a predictor as described in further detail later in this disclosure. In some examples, the data may take the form of one or more syntax elements that specify a quantization matrix used by quantization unit 54 to quantize a transform coefficient block corresponding to a video block to be coded, and quantization unit 54 may cause the one or more syntax elements to be included in the header of the coded video block.

In previous standards such as MPEG-2 and AVC/H.264, quantization matrices, as described above, were used to improve subjective quality. Quantization matrices are also included as part of the HEVC standard.

In HM5.1, transform sizes of 4×4, 8×8, 16×16, and 32×32 are possible. The 32×32 transform may be used for luma, and possibly only for luma (i.e., possibly not for chroma components). It may be appropriate to allow for a total of 20 quantization matrices (i.e., a separate quantization matrix for 4×4, 8×8, 16×16 intra and inter-predicted bocks for the Y, U and V components, as well as 32×32 for intra and inter-predicted blocks for the Y component). Thus, it may be possible that an encoder would signal 4064 quantization matrix values in order to signal all possible permutations. In some examples, zigzag scanning of quantization matrix entries, followed by first order prediction (e.g., differential coding) and exponential Golomb coding (with parameter=0) may be used to losslessly compress the quantization matrices. However, better compression methods may be desirable in HEVC due to the large number of quantization matrix coefficients.

Quantization matrices are typically designed to take advantage of the human visual system (HVS). The human visual system is typically less sensitive to quantization errors at higher frequencies. One reason for this is that the contrast sensitivity function (CSF) of the human visual system decreases with increasing frequency, both in horizontal and vertical directions. Hence, for well-designed quantization matrices, the matrix entries increase both in the row (left to right) and column (top to bottom) directions. In particular, as a block of transform coefficients extends from the DC position in the upper left (0, 0) corner to higher frequency coefficients toward the lower right (n, n) corner, the corresponding values in the quantization matrix generally increase, or at least do not decrease.

In previous techniques for signaling quantization matrices, all of the values (i.e., coefficients) for the entire quantization matrix were signaled. However, signaling of the entire quantization matrix may not be necessary because some coefficients, such as those towards the lower right corner of the quantization matrix, may not contribute substantially towards video quality.

As one example, higher block sizes, such as 32×32, are typically used when the residual block is smooth, where the residual block is the difference between the actual block of video data and a predicted block of the video data. A smooth residual block exhibits little deviation in values within the residual block. In this case, after quantization, it may be unlikely that there are many non-zero coefficients at higher frequencies (i.e., toward the lower right corner) of the transformed block.

Statistics of encoded video sequences support this assumption. For example, using a partial frequency transform technique (e.g., encoding the smallest 16×16 coefficients from a 32×32 block) shows very little loss in coding efficiency. This may be considered to be equivalent to choosing a very high value for quantization matrix entries for frequencies outside of the 16×16 region (e.g., high values for the coefficients of the quantization matrix for frequencies outside of the 16×16 region). In this example, because there may be very little loss in coding efficiency, it may be unnecessary to signal all of the 32×32 quantization matrix values, which is 1024 values, in the encoded video bitstream.

The following describes signaling and coding examples for quantization matrices. For instance, for signaling, video encoder 20 may signal a one bit flag to indicate whether the whole quantization matrix or only a subset of the quantization matrix is coded. If the flag indicates that the entire quantization matrix is coded, any coding method may be used, such as that of the HM5.1, AVC/H.264, JCTVC-F085, JCTVC-E073, or the techniques described in U.S. Provisional Patent Application No. 61/547,647, which is incorporated by reference in its entirety, and discussed in more detail below.

If the flag indicates that only a subset of the quantization matrix is being coded (e.g., the first subset), then the size of the subset may be coded as a pair of values (last_row, last_col). In this example, it is assumed that the subset is rectangular and covers quantization matrix entries from position (0,0) to position (last_row, last_col). However, it may be possible to use other shapes. It may also be possible to restrict the shape to be a square in which case only a single last value may need to be coded because the last_row and last_col values will be the same. The last values (last_row, last_col) may be coded with a fixed number of bits which may depend on the size of the quantization matrix. For example, for a 32×32 quantization matrix, the last values may be coded using 5+5=10 bits. It may be possible to use variable length codes, such as exponential Golomb or Golomb codes, to code the last values.

After coding the last values (last_row, last_col), the quantization matrix entries belonging to a subset may be coded (e.g., the values of the first subset). The HM5.1 method or any other method (such as AVC/H.264, JCTVC-F085, JCTVC-E073 or the techniques described in U.S. patent application Ser. No. 13/649,836, filed Oct. 11, 2012) may be used to code the quantization matrix entries belonging to the subset. The coding may be lossy or lossless.

In accordance with the techniques of U.S. patent application Ser. No. 13/649,836, video encoder 20 and video decoder 30 may perform a raster scan and a non-linear predictor technique for coding prediction errors for values of a first subset of the quantization matrix. According to an example technique, the predictor is the maximum of the value to the left and the value above in the first subset of the quantization matrix with respect to the current scan position in the quantization matrix. In other words, as the quantization matrix is scanned in raster order, a current value in the quantization matrix is predicted based on the maximum of the value to the left of the current value and the value above the current value. The raster order may generally refer to an order in which values in the quantization matrix are scanned in rows from top to bottom and within each row from left to right. In general, values in the quantization matrix will correspond to respective transform coefficients in a block of transform coefficients, where coefficients toward the upper left are low frequency and coefficients approaching the lower right increase in frequency.

After coding of the quantization matrix entries belonging to a subset is complete, the rest of the quantization matrix entries (e.g., the coefficient values of the second subset) may be predicted from the quantization matrix entries belonging to the subset. This process may be followed by both the encoder and the decoder. For instance, if the quantization matrix entries belonging to a subset were coded in a lossy manner, they are reconstructed. Then, the quantization matrix entries outside the subset (e.g., the coefficient values of the second subset) are scanned in a raster scan order, as one example, to predict the coefficient values of the second subset.

In examples of this disclosure, video encoder 20 may be configured to signal quantization matrix values for a subset of the quantization matrix. For example, the video encoder may divide the quantization matrix into at least a first subset and a second subset of quantization matrix values. The video encoder may encode the coefficient values of the first subset, and signal these encoded values to the video decoder as syntax elements. The video decoder may decode the coefficient values of the first subset from the received syntax elements.

In some examples of the disclosure, video decoder 30 may predict the values of the second subset. For instance, in some examples, video encoder 20 may not need to signal syntax elements that are used to derive the quantization matrix coefficient values of the second subset so that the video decoder can predict the values of the second subset. Rather, video decoder 30 may utilize techniques of this disclosure to predict the values of the second subset without utilizing such syntax elements. In this way, the amount of data that needs to be signaled for a quantization matrix may be reduced.

As one example, video decoder 20 may predict the coefficient values for the second subset of quantization matrix values based on the decoded coefficient values of the first subset of quantization matrix values, as is discussed in greater detail below. As another example, to predict the values for the second subset of quantization matrix values, video decoder 30 may assign each coefficient in the second subset a constant value, where the constant value may be a maximum allowable quantization matrix value, as one non-limiting example. In some examples, video encoder 20 may signal the constant value to the video decoder, or alternatively, video encoder 20 and video decoder 30 may be preprogrammed with the constant value.

Figure 4:
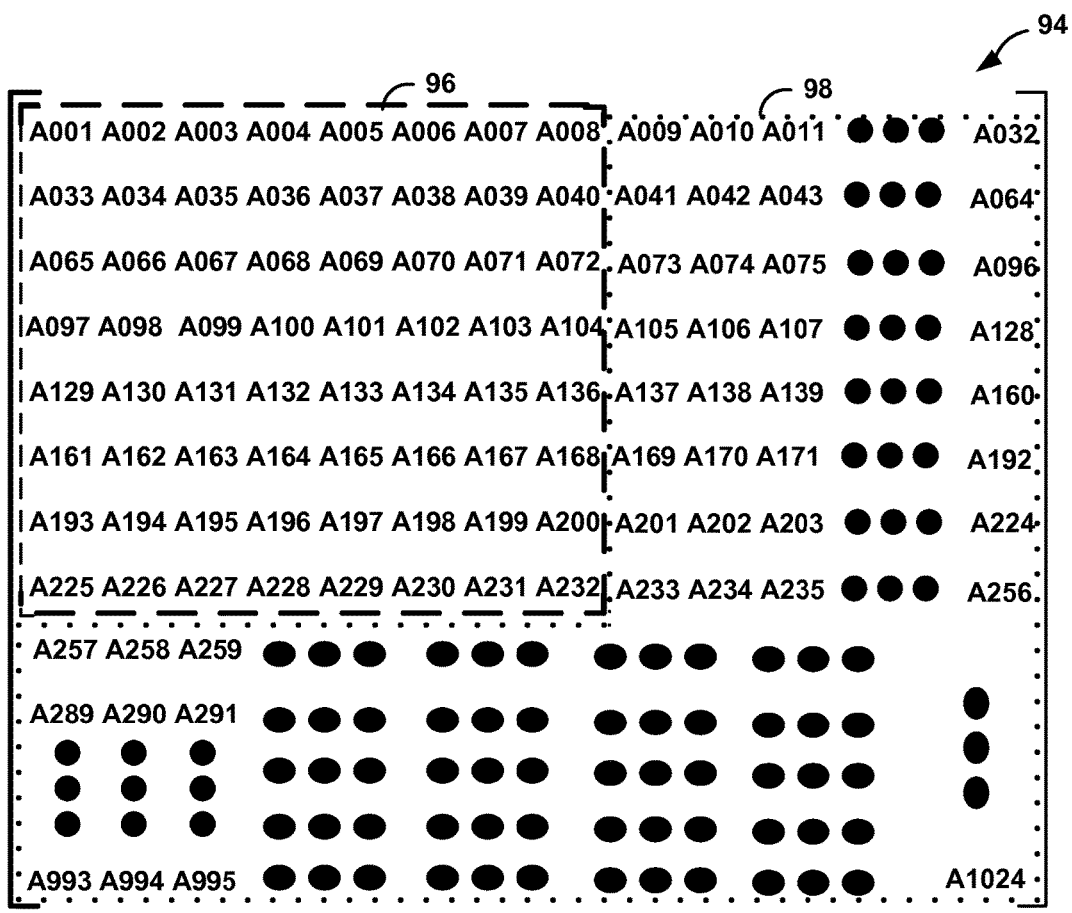
FIG. 4 is a conceptual diagram illustrating an example quantization matrix.

FIG. 4 is a graphical diagram illustrating an example quantization matrix. FIG. 4 illustrates quantization matrix 94 which is a 32×32 quantization matrix used to quantize a 32×32 block of residual transform coefficients. Although, the techniques relative to FIG. 4 are described in the context of a 32×32 quantization matrix, aspects of this disclosure are not so limited and may be extended to other sized quantization matrices, including non-square quantization matrices. Quantization matrix 94 includes first subset 96 which includes a subset of values of the entries of quantization matrix 94. In this example, the first subset 96 is an 8×8 matrix (including quantization matrix values A001 in the upper left corner and A232 in the lower right corner), although other sizes are possible, including non-square sizes. In this example, the coefficient values in the entries of first subset 96 may be encoded and signaled by video encoder 20. The size of first subset 96 may also be encoded and signaled. The size may be the last_row, and last column of first subset 96, which is (7, 7), assuming that variable A001 is located at (0, 0) in quantization matrix 94. Because this subset is a square, only one variable may be needed to be signaled (e.g., 7). For non-square subsets, the last_row, and last column values may be encoded and signaled.

In some examples, the values of the entries of second subset 98 may not be utilized to predict the values of the entries of second subset 98. The second subset includes quantization matrix values A009, A257, and A1024, among others, and is bounded by the dotted line. The ellipses represent additional quantization matrix values and are used to reduce the size of the drawing. In other words, the values of the entries of second subset 98 may be predicted without utilizing syntax elements that are computed from the coefficient values of the entries of the second subset. In some other examples, the values of the entries of second subset 98 may be determined from received downsampled values of the second subset from the video encoder, as will be discussed in more detail below.

In some examples, the values of the entries of second subset 98 may be the maximum of the quantization matrix value above a particular value or the maximum of the quantization matrix value to the left of the particular value. If no left or above value exists, then the left or above value is assumed to be zero. For example, to predict the coefficient values of the second subset of the quantization matrix, video encoder 20 or video decoder 30 may set a coefficient value for a current entry of the second subset at coordinate position [x, y] to be the greater of the coefficient value of an entry in the quantization matrix that is to the left at coordinate position [x−1, y] and the coefficient value of an entry in the quantization matrix that is above at coordinate position [x, y−1], (assuming the upper left corner is [0, 0] and the lower right corner is [n, n] in an n by n quantization matrix).

In some examples, the values of the entries of first subset 96 may be predicted in a raster scan order; however, other scan order may be used. In this example, rather than signaling the value of the quantization matrix itself, the difference between the current quantization matrix value and a previous quantization matrix value along the raster scan order is signaled. Since the quantization matrix values generally increase in the horizontal and vertical directions, the prediction errors (i.e., the difference between the current and previous quantization matrix value along the scan order) for the proposed predictor (i.e., the above and left quantization matrix values) are almost always non-negative. It should be noted that this proposed prediction scheme works well when asymmetric quantization matrices are used, whereas a zig-zag based scan would not be as effective.

In some examples, the prediction error is encoded using Golomb codes. The Golomb code parameter can be included by the encoder in the encoded video bitstream (using a fixed or variable-length code) or can be known to both the encoder and the decoder. It is possible to use other methods, such as exponential Golomb coding, to encode the prediction error. Due to the slightly spread-out nature of the prediction error, a Golomb code may be desirable. To be able to encode occasional negative values, a remapping method may be employed.

In some examples, one or more of the predicted coefficient values of the second subset may be predicted from other predicted coefficient values of the second subset. For example, a coefficient value of an entry in the quantization matrix that is also part of the second subset may be above a current entry in the second subset, and a coefficient value of an entry in the quantization matrix that is also part of the second subset may be to the left of the current entry in the second subset. In this example, the coefficient values for the entries which may be used to predict the coefficient value of the current entry may be predicted values themselves because these entries are also part of the second subset, and the coefficient values for the entries in the second subset may all be predicted. Video encoder 20 and video decoder 30 may use this process to derive all the quantization entries that are outside the subset (e.g., in the second subset). Graphical diagrams illustrating a quantization matrix and a reconstructed quantization matrix are illustrated in FIGS. 5 and 6, and are described in more detail below.

Returning to FIG. 4, as one example, the value of coefficient A009 of second subset 98 is predicted to be equal to coefficient A008 of first subset 96 because no value above A009 is available. The value of coefficient A257 of second subset 98 is predicted to be equal to coefficient A225 of first subset 96 because no value to the left of A257 is available. The value of coefficient A042 of second subset 98 is predicted to be the greater of the value of coefficient A010 and coefficient A041, both of second subset 98. In this example, the value of coefficients A010 and A041 are predicted value because both coefficients are in second subset 98.

Figure 5:
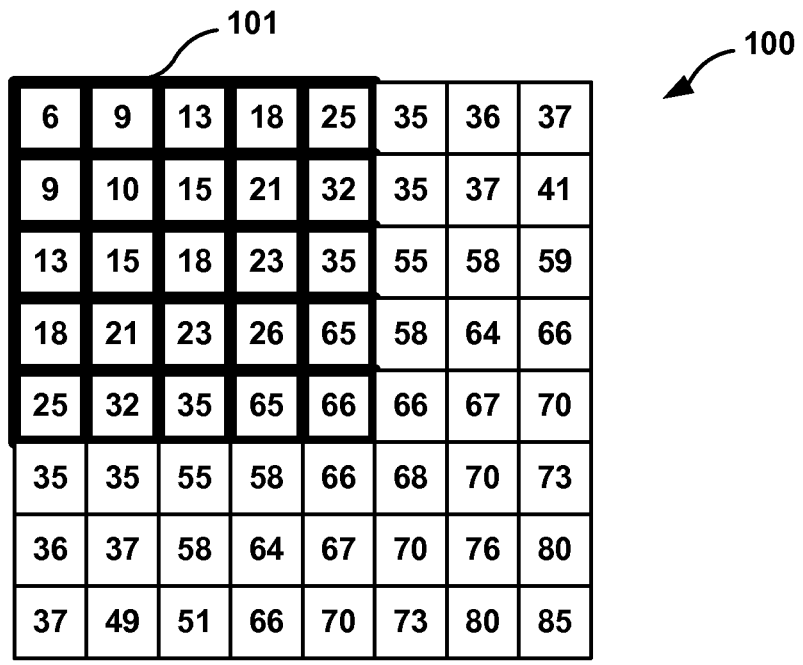
FIG. 5 is a conceptual diagram illustrating a quantization matrix with example values.

FIG. 5 is a graphical diagram illustrating a quantization matrix with example values that may be signaled using prediction in accordance with the techniques described above. FIG. 6 is a graphical diagram illustrating a reconstructed quantization matrix utilizing one or more example techniques of this disclosure. For example, for purposes of illustration, FIG. 5 illustrates a quantization matrix 100, which is an 8×8 matrix. In this example, video encoder 20 may signal the values for the first 5×5 entries in quantization matrix 100 (shown with bolded lines). For instance, in this example, the first subset 101 of quantization matrix 100 is the first 5×5 values, which means that, in this example, the values of last_row and last_col are each 4, assuming zero-based indices. Because the first subset 101 is a square, video encoder 20 may only signal the value 5 (e.g., since the last_row and last_col values are the same). The remaining values in quantization matrix 100 (i.e., those outside first subset 101) are considered to be in the second subset.

Figure 6:
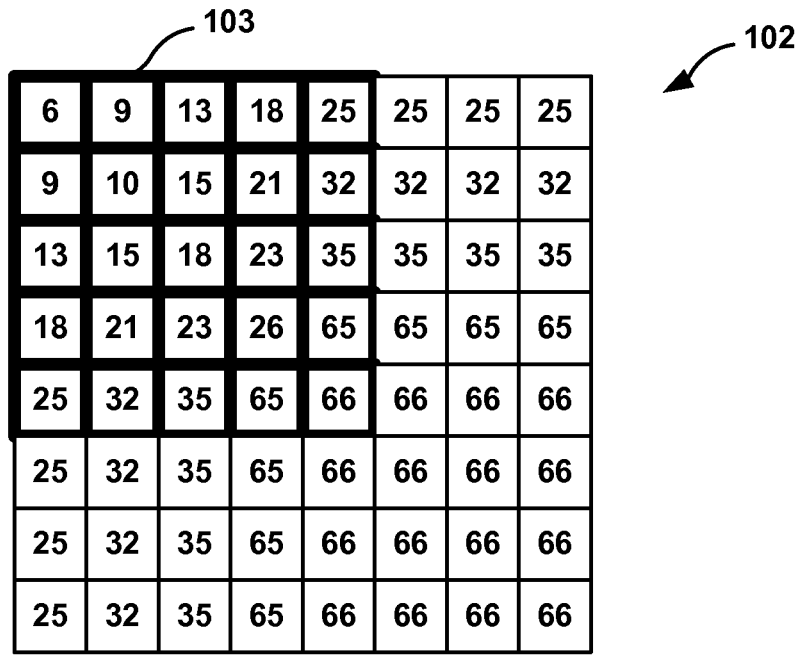
FIG. 6 is a conceptual diagram illustrating a reconstructed quantization matrix utilizing one or more example techniques of this disclosure.

FIG. 6 illustrates a reconstructed quantization matrix 102. In this example, video decoder 30 (or video encoder 20 in a reconstruction loop), may utilize one of the example techniques to generate reconstructed quantization matrix 102. For example, video decoder 30 and video encoder 20 may utilize the technique of determining the values of a second subset of quantization matrix values by using the maximum between the left coefficient and above coefficient relative to a current coefficient.

Reconstructed quantization matrix 102 illustrates the results of this technique. For example, the first 5×5 entries in first subset 103 are the same as the first 5×5 entries in the first subset 101 in quantization matrix 100, as these values were explicitly signaled. The remaining values (e.g., values of the second subset outside first subset 103) are derived from determining the maximum of above and left coefficients relative to a current coefficient.

In some example, instead of the prediction and raster scan described above, other scans and/or prediction may be used. Alternatively, the quantization matrix entries outside the subset (e.g., the coefficient values of the second subset) may be set to a constant value such as maximum allowable quantization matrix value. Such a constant value may be signaled in the bitstream from the video encoder to the video decoder, or the video encoder and the video decoder may be preprogrammed with the constant value.

In some examples, video encoder 20 may similarly predict the values in the second subset as is performed by video decoder 30. For example, video encoder 20 may predict the values of the second subset, and replace the values in the second subset with the predicted values of the second subset. In this way, the quantization matrix used on the video encoder side and the video decoder side may be the same.

In some video coding examples, it may not be sufficient to use a constant value for quantization matrix values or prediction from a first subset to determine the quantization matrix entries which are not explicitly signaled, (i.e., those entries outside the rectangle (0, 0) to ((last_row, last_col), values of the second subset). The following describes other examples for signaling quantization matrix values, such as using values for a different matrix and using downsampled values to determine the values of the second subset.

As one example, entries which are not explicitly signaled (e.g., values of the second subset) are derived from a different matrix (e.g., a smaller-sized quantization matrix). This smaller-sized quantization matrix may have been already coded in the bitstream that the video encoder signals, as one example. In some examples, the different matrix may be a quantization matrix. Video encoder 20 may have previously signaled this different matrix.

For example, the video encoder may signal the values for different quantization matrices, such as quantization matrices with sizes including 4×4, 8×8, 16×16, or 32×32. In this example, video decoder 30 may utilize coefficient values from any of the quantization matrices that were previously encoded in the bitstream to reconstruct the current quantization matrix. For instance, assume that the quantization matrix that is to be reconstructed is a 32×32 quantization matrix. In this example, video encoder 20 may signal coefficient values for a first subset of the 32×32 quantization matrix. Assuming that the video decoder has already received quantization matrices of sizes 4×4, 8×8 or 16×16, the video decoder may utilize the 4×4, 8×8, or the 16×16 quantization matrix to determine the values of for the second subset to reconstruct the 32×32 quantization matrix.

In some examples, it may be possible to use any of the 4×4, 8×8, or 16×16 quantization matrices in order to reconstruct the 32×32 quantization matrix. For example, to reconstruct the 32×32 quantization matrix, video decoder 30 may use the 8×8 quantization matrix, and the 8×8 quantization matrix may be a reconstructed quantization matrix that used a 4×4 quantization matrix for reconstruction. However, such layered reconstruction of quantization matrices may not be necessary in every example. For example, video encoder 20 may signal the entirety of an 8×8 quantization matrix that video decoder 30 uses to reconstruct the 32×32 quantization matrix. Some of the values of the 32×32 quantization matrix may be signaled, while other values may be reconstructed from one or more of the smaller matrices.

In addition, in some examples, the video encoder may signal the size of the smaller matrix (e.g., the first subset). In another example, video decoder 30 and video encoder 20 may be preprogrammed with the size of the smaller matrix (e.g., the size of the smaller matrix may be known a priori to video encoder 20 and video decoder 30).

As one specific example, assume that the quantization matrix is 32×32, and the last_row=14, and the last_col=14. In this example, video encoder 20 signals the values for the lowest 15×15 entries in the 32×32 quantization matrix. Assume that video decoder 30 is deriving the value for a matrix entry with index (r, c) where either r>=15 or c>=15. In this example, to derive the quantization matrix values, the video decoder may use the values from a different matrix (e.g., an 8×8 matrix) which may be a smaller-sized quantization matrix.

Video decoder 30 may utilize different ways to use the lower-sized quantization matrix to determine the values for the second subset. For example, the video decoder may determine a ratio between the size of the quantization matrix and the size of the different, smaller-sized matrix. Video decoder 30 may divide the location coordinate for the entry within the quantization matrix whose value is being determined (e.g., a value for an entry in the second subset) with the ratio, and use ceiling and floor functions to determine corresponding locations in the different, smaller-sized matrix. Video decoder 30 may then use the values in the different, smaller-sized matrix that correspond to the identified locations within the different, smaller-sized matrix to determine the values for the second subset in the quantization matrix that is being reconstructed.

For example, let $\hat{Q}_{N \times N}(r,c)$ denote the value of reconstructed quantization matrix of size N×N at position (r, c), where r is the row index and c is the column index. Let $r_L$=floor(r/4), $r_H$=ceil(r/4), $c_L$=floor(c/4), and $c_H$=ceil(c/4), where the factor 4 is derived as (32/8). Here floor(x) indicates the greatest integer less than or equal to x. Similarly, ceil(x) indicates the smallest integer greater than or equal to x. Then $\hat{Q}_{32 \times 32}(r,c)$ may be set to $\hat{Q}_{8 \times 8}(r_L,c_L)$ or it can be set to the average of $\hat{Q}_{8 \times 8}(r_L,c_L)$, $\hat{Q}_{8 \times 8}(r_L,c_H)$, $\hat{Q}_{8 \times 8}(r_H,c_L)$ and $\hat{Q}_{8 \times 8}(r_H,c_H)$. If the entire 8×8 quantization matrix was sent to the decoder, the reconstructed 8×8 matrix is the same as the original 8×8 quantization matrix. Bilinear interpolation or other more sophisticated interpolation techniques and/or longer interpolation filters may be used. The size of the matrix from which the missing values will be derived from, may be signaled in the bitstream or be known a priori to the video encoder and the video decoder. The values of the smaller matrix (e.g., the first subset) may be included in the bitstream as well.

In AVC/H.264, a zigzag scan and differential pulse code modulation (DPCM, i.e., prediction from last value in scan order) is used. Then, if a quantization matrix value is coded to be zero, this indicates that no more quantization matrix values are coded and the last coded positive quantization matrix value is repeated. In such a case, instead of repeating the last coded quantization matrix value, the remaining quantization matrix values may be derived from a quantization matrix of a lower size, as described earlier.

As described above, in some examples, video decoder 30 may determine the values of the second subset without receiving any syntax elements based on the values of the second subset. However, avoiding signaling of quantization matrix values in a second subset may not be beneficial in every example. That is, signaling at least some quantization matrix values for higher frequency components of a quantization matrix (e.g., those in a second subset of values) may provide for a better tradeoff between coding efficiency and errors in the reconstructed quantization matrix.

In another example of the disclosure, as is described in more detail below, video encoder 20 may downsample values of a subset of quantization matrix values, and signal the downsampled values. Video decoder may upsample the downsampled values to determine values needed to reconstruct the quantization matrix at the video decoder side. There may be a lesser amount of data in the downsampled values, as compared to the original values, and by signaling the downsampled values, the amount of data that is signaled for a quantization matrix may be reduced.

In one example of downsampling, values outside a subset of the quantization matrix (e.g., from (0, 0) to (last_row, last_col), i.e., the values in the second subset) may be downsampled by a certain factor (e.g., 2) and the downsampled values may be coded in the bitstream in a lossless manner. Any coding method such as those described in AVC/H.264, JCTVC-F085, JCTVC-E073 or the techniques described in the U.S. patent application Ser. No. 13/649,836 may be used to code the downsampled values. Downsampling may be performed using simple averaging (e.g., averaging of quantization matrix values in an N×N region) or using more sophisticated filters and/or equations. Both video encoder 20 and video decoder 30 may use upsampling of the coded values to generate the values outside the first subset (e.g., values for the second subset). The upsampling techniques may use simple pixel replication (i.e., using the downsampled value for all coordinates within the downsampled regions or more sophisticated techniques. For example, the downsampled quantization matrix values may be treated similarly to a downsampled image. Then, techniques known in the art for performing image upsampling, such as bilinear interpolation, bicubic interpolation, etc., may be used for upsampling the downsampled quantization matrix.

As described above, video encoder 20 may signal the coefficient values for the first subset explicitly, and determine the coefficient values for the second subset using some form of prediction. In the following example, rather than signaling coefficient values for the first subset and determining the values of the second subset with prediction, the following techniques may allow the video encoder to generate a coded bitstream that signals the coefficient values of the quantization matrix with different levels of coarseness. For example, coefficient values that correspond to lower frequency components of the quantization matrix may be signaled losslessly (i.e., explicitly) and other coefficient values (e.g., in second subsets, third subsets, etc.) may be signaled more and more coarsely (e.g., by using different downsampling factors). Coefficient values that correspond to lower frequency positions are generally located proximate to the origin of the quantization matrix (e.g., the row and column indices for the coefficient value are proximate to (0, 0)). In general, the following techniques allow for a video encoder to apply non-uniform amounts of downsampling to quantization matrix values based upon where the quantization matrix value is located in the quantization matrix.

The techniques of this example may provide for a scheme by which coefficient values that are located further away from the origin of the quantization matrix are approximated more coarsely than coefficient values that are located more proximate to the origin of the quantization matrix. In this example, the approximated quantization matrix values (e.g., in a second and/or third subset or greater) may be coded in the bitstream and signaled.

However, in some alternate examples, it may be possible to utilize the following technique on the coefficient values of the first subset, where the first subset is similar to that described above. In these alternate examples, the techniques may determine the coefficient values for the second subset using any of the above example techniques.

For example, for quantization matrix values located in a region near the origin of the quantization matrix (e.g., in a first subset close to (0, 0)), video encoder 20 may apply no downsampling (i.e., apply downsampling factor is 1). In this region, all quantization matrix values are signaled. If the location of the coefficient value in the quantization matrix is further away from the origin of the quantization matrix (e.g., in a second subset outside the first subset), video encoder 20 may apply a higher level of downsampling (e.g., apply a downsampling factor of 2, 3, 4, and so forth). A downsampling factor greater than 1 may indicate the number of coefficient values that are represented by one value. As one example, a downsampling factor of 2 may mean that $2^2$ (i.e., 4) coefficient values of the quantization matrix may be represented by each encoded value when pixel repetition is used for reconstruction. Similarly, a downsampling factor of 4 may mean that $2^4$ (i.e., 16) coefficient values of the quantization matrix may be represented by each encoded value when pixel repetition is used for reconstruction.

As discussed above, the value calculated according to the downsampling factor may be a simple average. For example, on the encoder side, for a downsampling factor of 2, four quantization matrix values in a 2×2 square are averaged, and the average of those four quantization matrix values is signaled. Likewise, if the downsampling factor is 4, sixteen quantization matrix values is a 4×4 square are averaged, and the average of those sixteen quantization matrix values is signaled. Other more sophisticated equations or filter techniques may be used to calculate the downsampled values.

In some examples, video encoder 20 may establish downsampling transition points (e.g., boundaries) within the quantization matrix. Coefficient values that are located in the quantization matrix between the first transition point and the origin of the quantization matrix are downsampled according to a first downsampling factor (which may be as low as one, meaning no downsampling), coefficient values that are located in the quantization matrix between the first transition point and a second transition point may be downsampled by a second downsampling factor, coefficient values that are located in the quantization matrix between the second transition point and a third transition point may be downsampled by a third downsampling factor, and so forth. In some examples, the amount by which the downsampling factor changes per transition point may be non-uniform; although, aspects of this disclosure are not so limited.

For instance, in some examples, the syntax element indicating the location of the subsets of the quantization matrix values may not be included in the bit-stream. Instead, the location of the regions are known a priori at both the video encoder and decoder. Using a downsampling factor of 1 may be equivalent to sending all the values, as is done for low frequency subset values in the previous examples (e.g., low frequency subset values refer to values that are located proximate to the origin of the quantization matrix). Additionally, for other areas which use a downsampling factor greater than 1, additional quantization matrix values may be included in the bit-stream. One example of this is shown in FIG. 7 for a 16×16 block.

Figure 7:
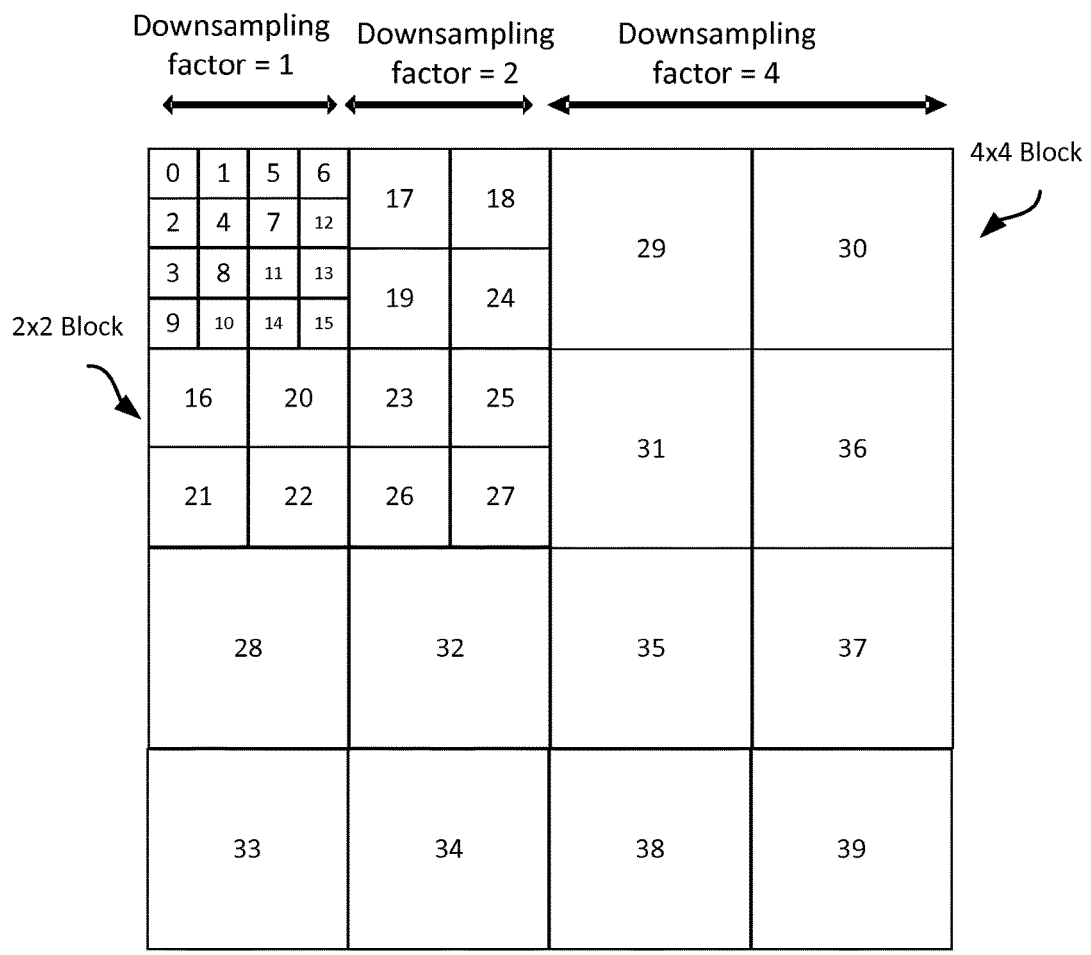
FIG. 7 is a conceptual diagram illustrating downsampling factors for different portions in one example of a quantization matrix.

In the example of FIG. 7, if both the row and column indices are in the range 0<=index<=3, a downsampling factor of 1 is used in each direction (i.e., no downsampling). If both the row and column indices are in the range 0<=index<=7, but both are not in the range 0<=index<=3, a downsampling factor of 2 is used in each direction (row/column). For all the remaining values, a downsampling factor of 4 is used in each direction. In FIG. 7, one quantization matrix value is coded for each one of the numbered squares. This value may be derived by simple averaging of all the quantization matrix values from the original 16×16 quantization matrix that belong to the corresponding square. While simple averaging is used in this example, it may also be possible to use more sophisticated downsampling filters. Squares 0-15 correspond directly to one quantization matrix value each, as the downsampling factor is 1 in this region. Squares 17-27 correspond to 2×2 blocks of quantization matrix values (i.e., 4 quantization matrix values), as the downsampling factor is 2 in this region. Squares 29-39 correspond to 4×4 blocks of quantization matrix values (i.e., 16 quantization matrix values), as the downsampling factor is 4 in this region. The numbers inside the squares represent the zigzag scan order in which the values are coded in the bitstream.

One quantization matrix value corresponding to each square may be included in the bitstream. This may be accomplished using a separate zigzag scan in a particular region for each downsampling factor. For example, first squares 0-15, corresponding to a downsampling factor of 1, are scanned in a zigzag order. This is followed by a zigzag scan of squares 17-27, corresponding to a downsampling factor of 2. This is followed by a zigzag scan of squares 28-39, corresponding to a downsampling factor of 4. If a zigzag scan for a higher downsampling factor travels over an area which was covered by another zigzag scan for a lower downsampling factor, no value is coded (e.g., when going from square 16 to square 17). However, if DPCM is used to code the downsampled values, the predictor for the next value in the zigzag scan may be derived from the corresponding quantization matrix values for a lower subsampling factor, which have already been coded in the bitstream.

For example, in FIG. 7, consider a zigzag scan corresponding to a subsampling factor of 2. The zigzag scan passes over squares with indices 16 and 17. There is an area between these two squares that has already been covered by the zigzag scan corresponding to the subsampling factor of 1 (squares 11-15). As such, no value is coded to the bitstream for that region, as this region has already been coded. However, when the quantization matrix value for the square with index 17 is being coded using DPCM, the prediction value is derived from already coded values for squares with indices 11, 13, 14, and 15. This quantization matrix value may be a simple average of the coded values rounded to the nearest integer.

Upon receiving the downsampled quantization matrix, video decoder 30 may decode the quantization matrix values for coefficient values in the same order in which they were included in the bitstream. Video decoder 30 may use simple replication for performing upsampling of the quantization matrix values. That is, all the positions within a square use the same quantization matrix value. This is typically the coded value corresponding to that square. More sophisticated upsampling filters may be used as well.

Figure 8:
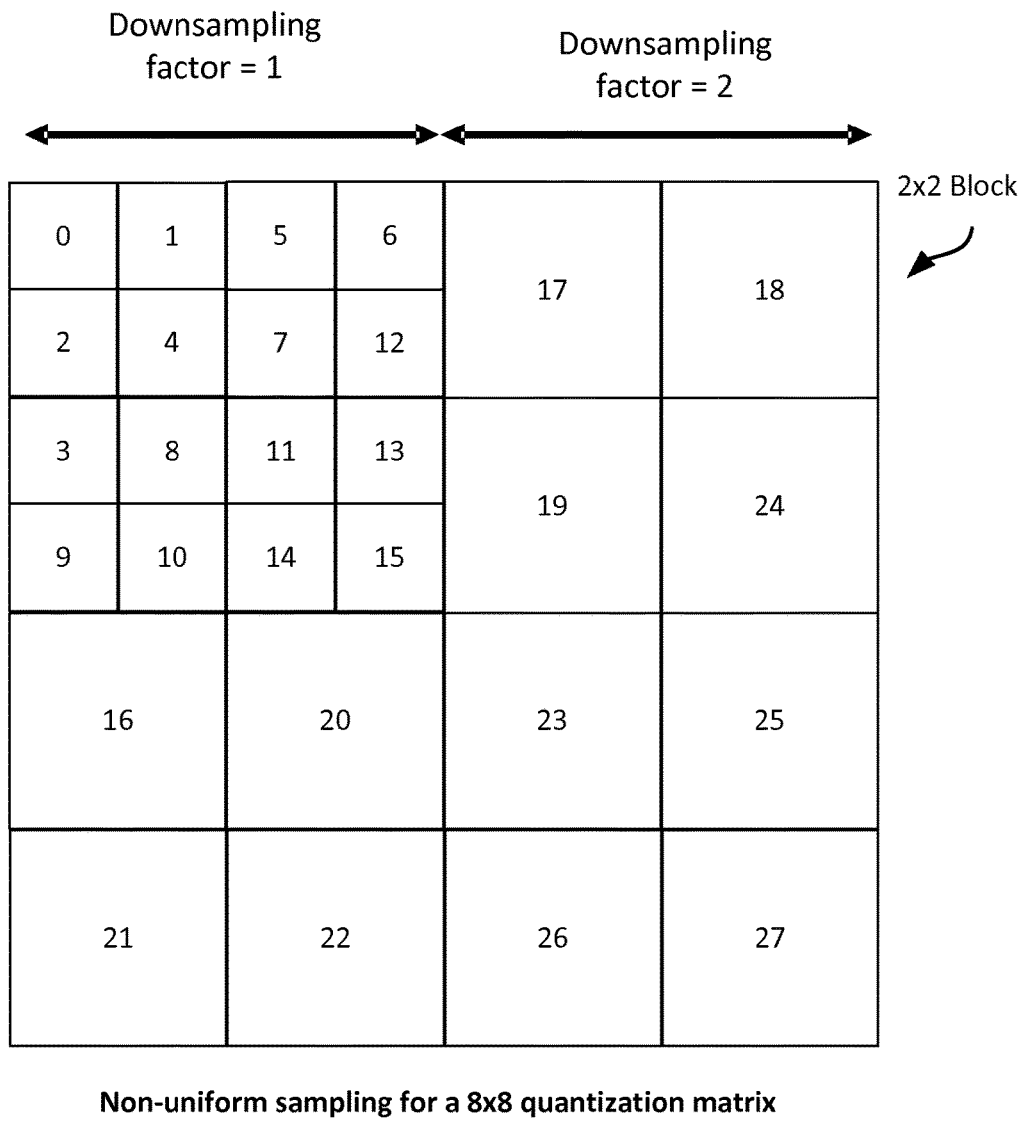
FIG. 8 is a conceptual diagram illustrating downsampling factors for different portions in another example of a quantization matrix.

As described above for other techniques, downsampled quantization matrix values may be coded using DPCM (prediction from previous value in the scan) followed by signed exponential Golomb coding. When some value is not coded because that area was already covered by a zigzag scan corresponding to a lower subsampling factor, the prediction for the next coded value is modified as described above. Any other prediction and coding method may also be used. Instead of 3 downsampling factors, such as shown in FIG. 7, fewer or more downsampling factors and regions may be used. FIG. 8 shows an example with 2 downsampling factors for an 8×8 block, where blocks 0-15 have a downsampling factor of 1 and blocks 17-27 have a downsampling factor of 2.

It should also be noted that other type of scans such as up-diagonal may be used. Also the scan may be in the reverse order. For example, first the values corresponding to downsampling factor of 3 may be coded. This may be followed by values corresponding to downsampling factor of 2, and so on.

Figure 9:
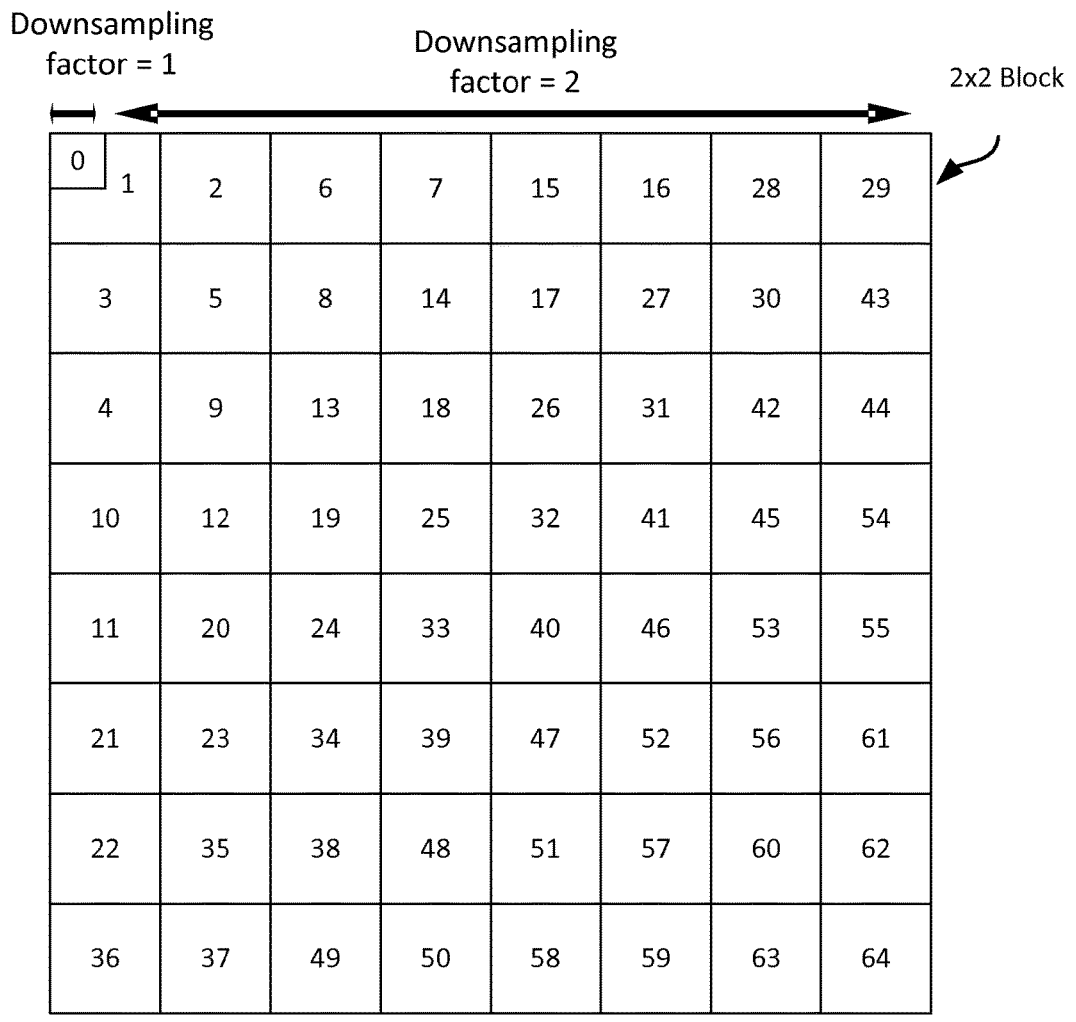
FIG. 9 is a conceptual diagram illustrating downsampling factors for different portions in another example of a quantization matrix.

In one particular example of the disclosure, the DC coefficient of the quantization matrix (i.e., the quantization matrix value at position (0,0), is the only value in a first subset and is downsampled with a downsampling factor of 1 (i.e., it is explicitly signaled). All other quantization matrix values in the quantization matrix are considered to be in a second subset and are downsampled at a factor of 2 or greater. FIG. 9 shows a 16×16 quantization matrix coded according to this example. As shown in FIG. 9, the DC coefficient in square 0 is coded explicitly (i.e., with a downsampling factor of 1), and all other quantization matrix values in the quantization matrix are downsampled with a factor of 2. Note that square 1, downsampled with a factor of 2, technically includes the DC coefficient. The value used for this particular 2×2 block may be determined as an average of the three remaining quantization matrix values (i.e., those other than the DC coefficient), as an average of all four quantization matrix values in the region (i.e., an average including the DC coefficient), or using some other filtering technique.

In another example of the disclosure, for a 32×32 block, the following downsampling transition points may be used. If both the row and column indices are in the range 0<=index<=3, a downsampling factor of 1 is used in each direction (i.e., no downsampling). If both the row and column indices are in the range 0<=index<=15, but both are not in the range 0<=index<=3, a downsampling factor of 2 may be used in each direction (row/column). For all the remaining values, a downsampling factor of 4 may be used in each direction. The transition points where the downsampling factor changes values (e.g., from 1 to 2 or 2 to 4) and the actual downsampling factors may be included in the bitstream or they may be known a priori at both video encoder 20 and video decoder 30.

In one example of the disclosure, if uniform sampling is used, only an 8×8 matrix needs to be coded. For non-uniform sampling, more quantization matrix values are coded, as a more precise approximation to the full quantization matrix (32×32 or 16×16) is achieved.

For the uniform sampling example, instead of coding a 16×16 or a 32×32 quantization matrix, a quantization matrix of lower size (e.g., 8×8) is coded in the bitstream. Then, when a value of a quantization matrix entry for the larger matrix needs to be generated, an interpolation may be used. If the quantization matrix entry represents a frequency in a lower frequency subset, such as lowest 8×8 frequencies, bilinear interpolation is used to calculate the value of the quantization matrix entry for the larger quantization matrix. For the rest of the area, replication of corresponding values from the quantization matrix of lower size is used. Instead of using the lowest 8×8 frequencies, any other subset may be used. Furthermore, instead of bilinear interpolation and pixel replication, any two interpolation methods may be used. This technique may be further generalized to more than 2 regions and more than 2 interpolation methods.

With respect to FIGS. 7, 8, and 9, and the example described above where coefficient values are downsampled, different downsampling factors are used in different areas (i.e., representing different subsets of quantization matrix values). For each subset, one quantization matrix value may be signaled for each block (e.g., the numbered squares in FIGS. 7-9), where the number of quantization matrix values represented by each block is determined by the downsampling factor for the particular subset. The position where a switch occurs between downsampling factors may be known to the video encoder and video decoder or signaled explicitly.

In other words, the downsampling techniques discussed above may allow video encoder 20 to signal the lower frequency quantization matrix values losslessly (in one example on the DC coefficient) and approximate other quantization matrix values more and more coarsely. This may avoid the necessity to have the entire quantization matrix in memory, which may be beneficial for 16×16 and 32×32 block sizes (although the benefits may be applicable to different sized blocks as well).

According to the techniques described above, video encoder 20 may be configured to determine a quantization matrix that includes a plurality of values, downsample a first set of values in the quantization matrix by a first downsampling factor to generate a first set of downsampled values, downsample a second set of values in the quantization matrix by a second downsampling factor to generate a second set of downsampled values, and generate a coded bitstream that includes the first set of downsampled values and the second set of downsampled values.

Returning to FIG. 2, following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

In some examples, entropy encoding unit 56 may be operable to perform the techniques of this disclosure. However, aspects of this disclosure are not so limited. In alternate examples, some other unit of video encoder 20, such as a processor, or any other unit of video encoder 20 may be tasked to perform the techniques of this disclosure. As one example, entropy encoding unit 56 may be operable to encode a size of a first subset of a quantization matrix, encode coefficient values of the first subset, and predict coefficient values of a second subset of the quantization matrix. Also, in some examples, the techniques of this disclosure may be divided among one or more of the units of video encoder 20.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64. The reference block may be used by motion estimation unit 42 and motion compensation unit 44 as a reference block to inter-predict a block in a subsequent video frame or picture.

Figure 3:
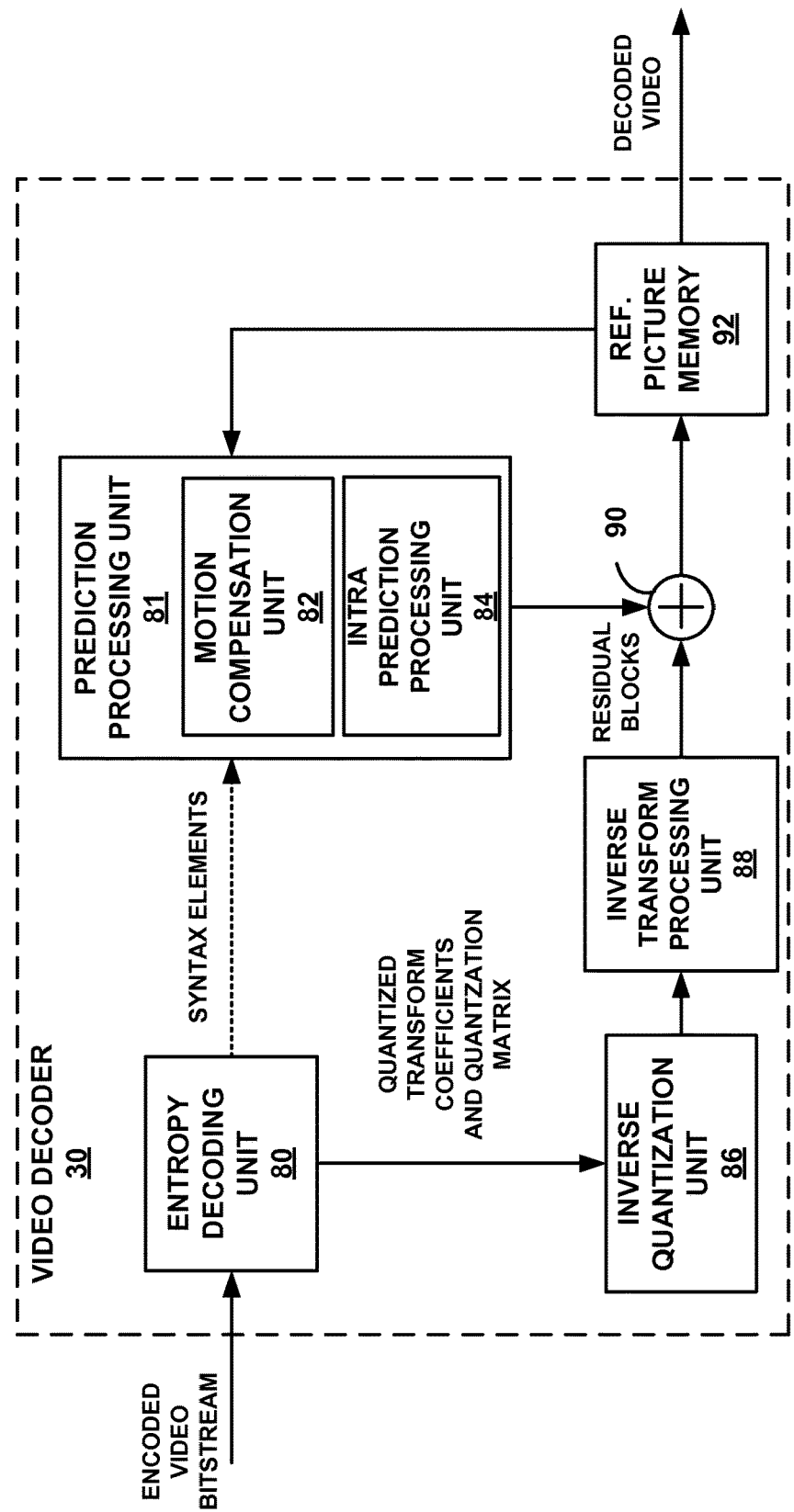
FIG. 3 is a block diagram illustrating an example video decoder that may implement the techniques described in this disclosure.

FIG. 3 is a block diagram illustrating an example video decoder 30 that may implement the techniques described in this disclosure. In the example of FIG. 3, video decoder 30 includes an entropy decoding unit 80, prediction processing unit 81, inverse quantization unit 86, inverse transformation unit 88, summer 90, and reference picture memory 92. Prediction processing unit 81 includes motion compensation unit 82 and intra prediction processing unit 84. Video decoder 30 may, in some examples, perform a decoding pass generally reciprocal to the encoding pass described with respect to video encoder 20 from FIG. 2.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

In some examples, entropy decoding unit 80 may be operable to perform the techniques of this disclosure. However, aspects of this disclosure are not so limited. In alternate examples, some other unit of video decoder 30, such as a processor, or any other unit of video decoder 30 may be tasked to perform the techniques of this disclosure. As one example, entropy decoding unit 80 may be operable to decode a size of a first subset of a quantization matrix, decode coefficient values of the first subset, and predict coefficient values of a second subset of the quantization matrix. Also, in some examples, the techniques of this disclosure may be divided among one or more of the units of video decoder 30.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter and/or quantization matrix calculated and signaled by video encoder 20 for each video block in the video slice to determine a degree of quantization and, likewise, a degree of inverse quantization that should be applied. In particular, inverse quantization unit 86 may be configured to decode a received quantization matrix that has been coded according to the techniques described above. In particular, video decoder 30 may be configured to upsample a received quantization matrix that has been downsampled according to the techniques of this disclosure.

In one example of the disclosure, video decoder 30 may be configured to receive a quantization matrix coded with downsampled values in a coded bitstream, upsample a first set of downsampled values in the quantization matrix by a first upsampling factor to generate a first set of values, upsample a second set of downsampled values in the quantization matrix by a second upsampling factor to generate a second set of values, and inverse quantize a block of transform coefficients with the first and second set of values.

Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 1.

Figure 10:
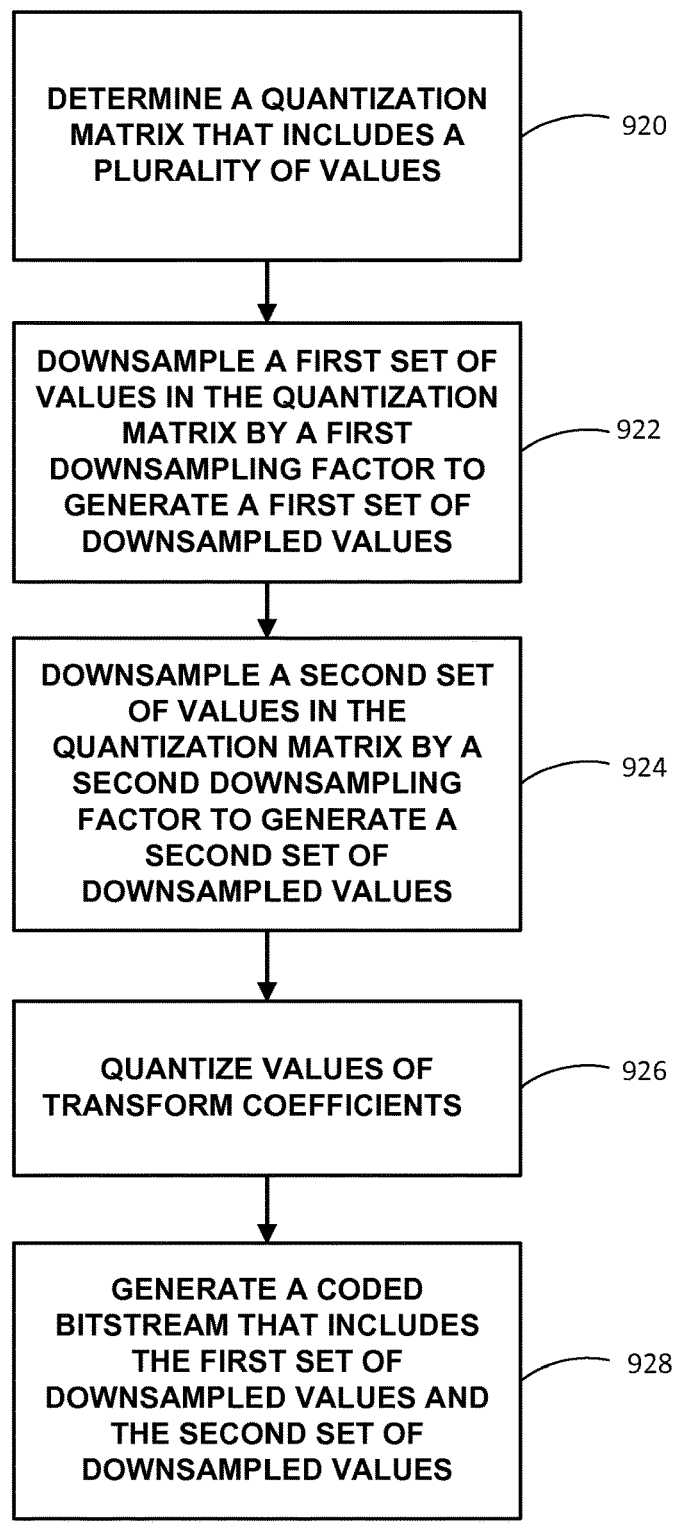
FIG. 10 is a flowchart illustrating a video encoding method according to the techniques of this disclosure.

FIG. 10 is a flowchart illustrating a video encoding method according to the techniques of this disclosure. The method of FIG. 10 may be performed by video encoder 20. Video encoder 20 may be configured to determine a quantization matrix that includes a plurality of values (920), downsample a first set of values in the quantization matrix by a first downsampling factor to generate a first set of downsampled values (922), and downsample a second set of values in the quantization matrix by a second downsampling factor to generate a second set of downsampled values (924).

In one example of the disclosure, video encoder 20 may determine the first downsampling factor based on a location of the first set of values in the quantization matrix, and determine the second downsampling factor based on a location of the second set of values in the quantization matrix. In a specific example, the first set of values includes only the value at location (0,0) of the quantization matrix, wherein the first downsampling factor is determined to be 1, and wherein the second downsampling factor is determined to be one of 2 and 4.

Video encoder 20 may be configured to determine transition points in the quantization matrix to determine how quantization matrix values are downsampled. In one example, video encoder 20 may be configured to determine a first transition point in the quantization matrix, wherein values located between the first transition point and an origin of the quantization matrix are not downsampled, determine a second transition point in the quantization matrix, wherein the first set of values in the quantization matrix are located between the first transition point and the second transition point, and determine a third transition point in the quantization matrix, wherein the second set of values in the quantization matrix are located between the second transition point and the third transition point. Video encoder 20 may be configured to signal the first, second, and third transition points, and the first and second downsampling factors in the coded bitstream.

In one example of the disclosure, video encoder 20 may be configured to signal the downsampled values by predicting one of the downsampled values along a scan order in the first and second sets of downsampled values from a previous downsampled value along the scan order in the first and second sets of downsampled values, wherein downsampled values in the first set may be used to predict downsampled values in the second set.

In another example of the disclosure, downsampling the first set of values in the quantization matrix comprises averaging a first number of quantization matrix values in the first set of values to generate values in the first set of downsampled values, wherein the first number is determined from the first downsampling factor, and wherein downsampling the second set of values in the quantization matrix comprises averaging a second number of quantization matrix values in the second set of values to generate values in the second set of downsampled values, wherein the second number is determined from the second downsampling factor.

Video encoder 20 may be further configured to quantize values of transform coefficient in a block of transform coefficients according to the quantization matrix to form quantized transform coefficients (926). Vide encoder 20 may be further configured to generate a coded bitstream that includes the first set of downsampled values and the second set of downsampled values (928).

Figure 11:
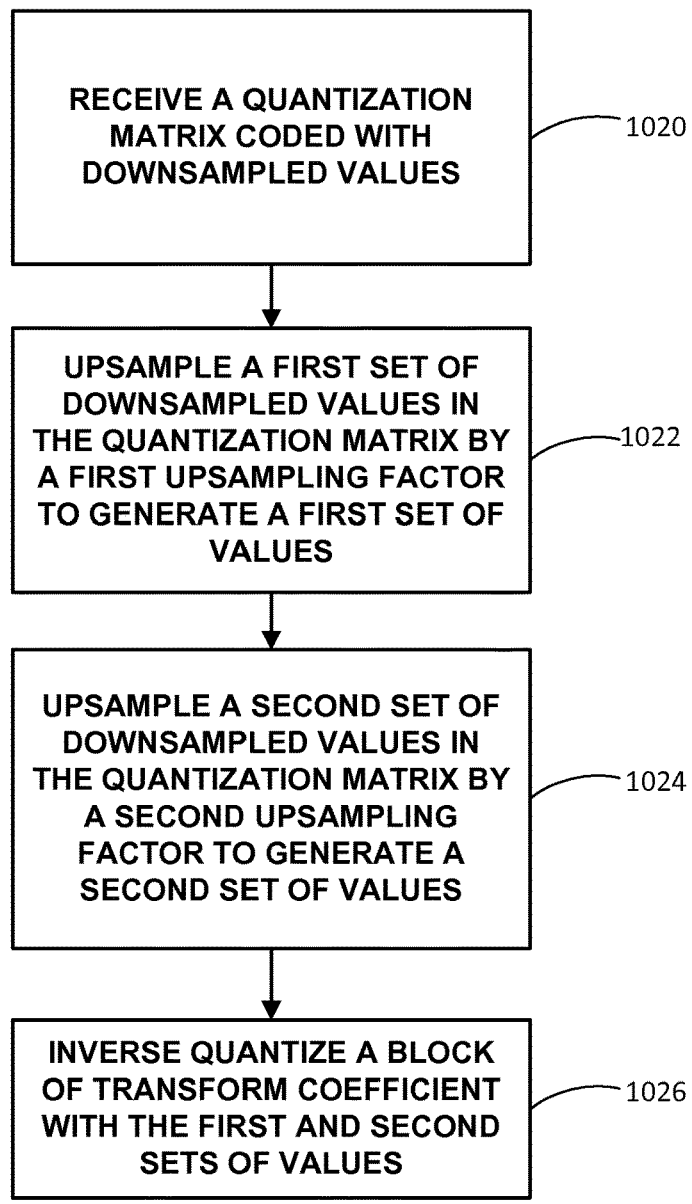
FIG. 11 is a flowchart illustrating a video decoding method according to the techniques of this disclosure.

FIG. 11 is a flowchart illustrating a video decoding method according to the techniques of this disclosure. The method of FIG. 11 may be performed by video decoder 30. Video decoder 30 may be configured to receive a quantization matrix coded with downsampled values in a coded bitstream (1020), upsample a first set of downsampled values in the quantization matrix by a first upsampling factor to generate a first set of values (1022), upsample a second set of downsampled values in the quantization matrix by a second upsampling factor to generate a second set of values (1024), and inverse quantize a block of transform coefficients with the first and second sets of values (1026).

In one example of the disclosure, video decoder 30 may be configured to determine the first upsampling factor based on a location of the first set of downsampled values in the quantization matrix, and to determine the second upsampling factor based on a location of the second set of downsampled values in the quantization matrix. In a specific example, the first set of downsampled values includes only the value at location (0,0) of the quantization matrix, wherein the first upsampling factor is determined to be 1, and wherein the second upsampling factor is determined to be one of 2 and 4.

In another example of the disclosure, video decoder 30 may be configured to determine a first transition point in the quantization matrix, wherein values of the quantization matrix located between the first transition point and an origin of the quantization matrix are not downsampled, determine a second transition point in the quantization matrix, wherein the first set of downsampled values in the quantization matrix are located between the first transition point and the second transition point, and determine a third transition point in the quantization matrix, wherein the second set of downsampled values in the quantization matrix are located between the second transition point and the third transition point. In this example, the first, second, and third transition points, and the first and second downsampling factors, are received in the coded bitstream.

In another example of the disclosure, video decoder 30 is configured to predict each successive one of the downsampled values along a scan order in the first and second sets of downsampled values from a previous downsampled value along the scan order in the first and second sets of downsampled values, wherein downsampled values in the first set may be used to predict downsampled values in the second set.

In another example of the disclosure, upsampling the first set of values in the quantization matrix by replicating a downsampled value in the first set of downsampled values for a first number of the first set of values, wherein the first number is determined from the first upsampling factor, and upsampling the second set of values in the quantization matrix comprises replicating a downsampled value in the second set of downsampled values for a second number of the second set of values, wherein the second number is determined from the second upsampling factor.

In one example of the disclosure, different upsampling techniques are used to upsample the first and second set of downsampled values. In a specific example, at least of the first and second set of values is upsampled using bilinear interpolation.

Video decoder 30 may be further configured to inverse transform the inverse quantized block of transform coefficients to form a residual block of video data, and to perform a prediction process on the residual block of video data to form a decoded block of video data.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding video data comprising:
determining a quantization matrix that includes a plurality of values, wherein the quantization matrix is used to quantize transform coefficients;
determining a first downsampling factor based on a location of a first set of values in the quantization matrix, wherein the first set of values includes only the value at location (0,0) of the quantization matrix;
determining a second downsampling factor based on a location of a second set of values in the quantization matrix, wherein the second set of values is different from the first set of values;
downsampling the first set of values in the quantization matrix by the first downsampling factor to generate a first set of downsampled values;
downsampling the second set of values in the quantization matrix by the second downsampling factor to generate a second set of downsampled values, wherein the second set of downsampled values has fewer values than the second set of values in the quantization matrix and represents the second set of values in the quantization matrix, wherein each value of the second set of downsampled values represents a plurality of values of the second set of values, wherein downsampling the second set of values in the quantization matrix comprises filtering a number of quantization matrix values in the second set of values to generate values in the second set of downsampled values, and wherein the number of quantization matrix values in the second set of values is determined from the second downsampling factor; and
generating a coded bitstream that includes the first set of downsampled values and the second set of downsampled values.

2. The method of claim 1, wherein the first downsampling factor is determined to be 1, and wherein the second downsampling factor is determined to be one of 2 and 4.

3. The method of claim 1, wherein the quantization matrix has a size of 16×16 or 32×32.

4. The method of claim 1, further comprising:
predicting one of the downsampled values along a scan order in the first and second sets of downsampled values from a previous downsampled value along the scan order in the first and second sets of downsampled values, wherein downsampled values in the first set may be used to predict downsampled values in the second set.

5. The method of claim 1, further comprising:
performing a prediction process on a block of video data to form a block of residual video data;
transforming the residual video data to form a block of transform coefficients;
quantizing values of transform coefficients in the block of transform coefficients according to the quantization matrix to form quantized transform coefficients; and
entropy coding the quantized transform coefficients into the coded bitstream.

6. A method of decoding video data comprising:
receiving a quantization matrix coded with downsampled values in a coded bitstream;
determining a first upsampling factor based on a location of a first set of downsampled values in the quantization matrix, wherein the first set of downsampled values includes only the value at location (0,0) of the quantization matrix;
determining a second upsampling factor based on a location of a second set of downsampled values in the quantization matrix, wherein the second set of downsampled values is different from the first set of downsampled values;
upsampling the first set of downsampled values in the quantization matrix by the first upsampling factor to generate a first set of values;
upsampling the second set of downsampled values in the quantization matrix by the second upsampling factor to generate a second set of values, wherein the second set of downsampled values has fewer values than the second set of values and represents the second set of values, wherein each value of the second set of downsampled values represents a plurality of values of the second set of values, wherein upsampling the second set of downsampled values in the quantization matrix comprises replicating a downsampled value in the second set of downsampled values for a number of the second set of values, and wherein the number of the second set of values is determined from the second upsampling factor; and
inverse quantizing a block of transform coefficients with the first and second sets of values.

7. The method of claim 6, wherein the first upsampling factor is determined to be 1, and wherein the second upsampling factor is determined to be one of 2 and 4.

8. The method of claim 7, wherein the quantization matrix has a size of 16×16 or 32×32.

9. The method of claim 6, further comprising:
predicting each successive one of the downsampled values along a scan order in the first and second sets of downsampled values from a previous downsampled value along the scan order in the first and second sets of downsampled values, wherein downsampled values in the first set may be used to predict downsampled values in the second set.

10. The method of claim 6, wherein different upsampling techniques are used to upsample the first and second set of downsampled values.

11. The method of claim 6, wherein at least one of the first and second set of values is upsampled using bilinear interpolation.

12. The method of claim 6, further comprising:
inverse transforming the inverse quantized block of transform coefficients to form a residual block of video data; and
performing a prediction process on the residual block of video data to form a decoded block of video data.

13. An apparatus configured to code video data comprising:
a memory configured to store the video data; and
a video encoder configured to:
determine a quantization matrix that includes a plurality of values, wherein the quantization matrix is used to quantize transform coefficients;
determine a first downsampling factor based on a location of a first set of values in the quantization matrix, wherein the first set of values includes only the value at location (0,0) of the quantization matrix;
determine a second downsampling factor based on a location of a second set of values in the quantization matrix, wherein the second set of values is different from the first set of values;
downsample the first set of values in the quantization matrix by the first downsampling factor to generate a first set of downsampled values;
downsample the second set of values in the quantization matrix by the second downsampling factor to generate a second set of downsampled values, wherein the second set of downsampled values has fewer values than the second set of values in the quantization matrix and represents the second set of values in the quantization matrix, wherein each value of the second set of downsampled values represents a plurality of values of the second set of values, wherein downsampling the second set of values in the quantization matrix comprises filtering a number of quantization matrix values in the second set of values to generate values in the second set of downsampled values, and wherein the number of quantization matrix values in the second set of values is determined from the second downsampling factor; and
generate a coded bitstream related to the video data that includes the first set of downsampled values and the second set of downsampled values.

14. The apparatus of claim 13, wherein the first downsampling factor is determined to be 1, and wherein the second downsampling factor is determined to be one of 2 and 4.

15. The apparatus of claim 14, wherein the quantization matrix has a size of 16×16 or 32×32.

16. The apparatus of claim 13, wherein the video encoder is further configured to:
predict one of the downsampled values along a scan order in the first and second sets of downsampled values from a previous downsampled value along the scan order in the first and second sets of downsampled values, wherein downsampled values in the first set may be used to predict downsampled values in the second set.

17. The apparatus of claim 13, wherein the video encoder is further configured to:
perform a prediction process on a block of video data to form a block of residual video data;
transform the residual video data to form a block of transform coefficients;
quantize values of transform coefficients in the block of transform coefficients according to the quantization matrix to form quantized transform coefficients; and
entropy code the quantized transform coefficients into the coded bitstream.

18. An apparatus configured to decode video data comprising:
a memory configured to store the video data; and
a video decoder configured to:
receive a quantization matrix coded with downsampled values in a coded bitstream of the video data;
determine a first upsampling factor based on a location of a first set of downsampled values in the quantization matrix, wherein the first set of downsampled values includes only the value at location (0,0) of the quantization matrix;
determine a second upsampling factor based on a location of a second set of downsampled values in the quantization matrix, wherein the second set of downsampled values is different from the first set of downsampled values;
upsample the first set of downsampled values in the quantization matrix by the first upsampling factor to generate a first set of values;
upsample the second set of downsampled values in the quantization matrix by the second upsampling factor to generate a second set of values, wherein the second set of downsampled values has fewer values than the second set of values and represents the second set of values, wherein each value of the second set of downsampled values represents a plurality of values of the second set of values, wherein upsampling the second set of downsampled values in the quantization matrix comprises replicating a downsampled value in the second set of downsampled values for a number of the second set of values, and wherein the number of the second set of values is determined from the second upsampling factor; and
inverse quantize a block of transform coefficients with the first and second sets of values.

19. The apparatus of claim 18, wherein the first upsampling factor is determined to be 1, and wherein the second upsampling factor is determined to be one of 2 and 4.

20. The apparatus of claim 19, wherein the quantization matrix has a size of 16×16 or 32×32.

21. The apparatus of claim 18, wherein the video decoder is further configured to:
predict each successive one of the downsampled values along a scan order in the first and second sets of downsampled values from a previous downsampled value along the scan order in the first and second sets of downsampled values, wherein downsampled values in the first set may be used to predict downsampled values in the second set.

22. The apparatus of claim 18, wherein different upsampling techniques are used to upsample the first and second set of downsampled values.

23. The apparatus of claim 18, wherein at least one of the first and second set of values is upsampled using bilinear interpolation.

24. The apparatus of claim 18, wherein the video decoder is further configured to:
inverse transform the inverse quantized block of transform coefficients to form a residual block of video data; and
perform a prediction process on the residual block of video data to form a decoded block of video data.

25. An apparatus configured to encode video data comprising:
means for determining a quantization matrix that includes a plurality of values, wherein the quantization matrix is used to quantize transform coefficients;
means for determining a first downsampling factor based on a location of a first set of values in the quantization matrix, wherein the first set of values includes only the value at location (0,0) of the quantization matrix;

means for determining a second downsampling factor based on a location of a second set of values in the quantization matrix, wherein the second set of values is different from the first set of values;

means for downsampling the first set of values in the quantization matrix by the first downsampling factor to generate a first set of downsampled values;

means for downsampling the second set of values in the quantization matrix by the second downsampling factor to generate a second set of downsampled values, wherein the second set of downsampled values has fewer values than the second set of values in the quantization matrix and represents the second set of values in the quantization matrix, wherein each value of the second set of downsampled values represents a plurality of values of the second set of values, wherein the means for downsampling the second set of values in the quantization matrix comprises means for filtering a number of quantization matrix values in the second set of values to generate values in the second set of downsampled values, and wherein the number of quantization matrix values in the second set of values is determined from the second downsampling factor; and means for generating a coded bitstream that includes the first set of downsampled values and the second set of downsampled values.

26. An apparatus configured to decode video data comprising:

means for receiving a quantization matrix coded with downsampled values in a coded bitstream;

means for determining a first upsampling factor based on a location of a first set of downsampled values in the quantization matrix, wherein the first set of downsampled values includes only the value at location (0,0) of the quantization matrix;

means for determining a second upsampling factor based on a location of a second set of downsampled values in the quantization matrix, wherein the second set of downsampled values is different from the first set of downsampled values;

means for upsampling the first set of downsampled values in the quantization matrix by the first upsampling factor to generate a first set of values;

means for upsampling the second set of downsampled values in the quantization matrix by the second upsampling factor to generate a second set of values, wherein the second set of downsampled values has fewer values than the second set of values and represents the second set of values, wherein each value of the second set of downsampled values represents a plurality of values of the second set of values, wherein the means for upsampling the second set of downsampled values in the quantization matrix comprises means for replicating a downsampled value in the second set of downsampled values for a number of the second set of values, and wherein the number of the second set of values is determined from the second upsampling factor; and means for inverse quantizing a block of transform coefficients with the first and second sets of values.

27. A non-transitory computer-readable storage medium storing instructions that, when executed, cause one or more processors of a device configured to encode video data to:

determine a quantization matrix that includes a plurality of values, wherein the quantization matrix is used to quantize transform coefficients;

determine a first downsampling factor based on a location of a first set of values in the quantization matrix, wherein the first set of values includes only the value at location (0,0) of the quantization matrix;

determine a second downsampling factor based on a location of a second set of values in the quantization matrix, wherein the second set of values is different from the first set of values;

downsample the first set of values in the quantization matrix by the first downsampling factor to generate a first set of downsampled values;

downsample the second set of values in the quantization matrix by the second downsampling factor to generate a second set of downsampled values, wherein the second set of downsampled values has fewer values than the second set of values in the quantization matrix and represents the second set of values in the quantization matrix, wherein each value of the second set of downsampled values represents a plurality of values of the second set of values, wherein, to downsample the second set of values in the quantization matrix, the one or more processors are configured to filter a number of quantization matrix values in the second set of values to generate values in the second set of downsampled values, and wherein the number of quantization matrix values in the second set of values is determined from the second downsampling factor; and generate a coded bitstream that includes the first set of downsampled values and the second set of downsampled values.

28. A non-transitory computer-readable storage medium storing instructions that, when executed, cause one or more processors of a device configured to decode video data to:

receive a quantization matrix coded with downsampled values in a coded bitstream;

determine a first upsampling factor based on a location of a first set of downsampled values in the quantization matrix, wherein the first set of downsampled values includes only the value at location (0,0) of the quantization matrix;

determine a second upsampling factor based on a location of a second set of downsampled values in the quantization matrix, wherein the second set of downsampled values is different from the first set of downsampled values;

upsample the first set of downsampled values in the quantization matrix by the first upsampling factor to generate a first set of values;

upsample the second set of downsampled values in the quantization matrix by the second upsampling factor to generate a second set of values, wherein the second set of downsampled values has fewer values than the second set of values and represents the second set of values, wherein each value of the second set of downsampled values represents a plurality of values of the second set of values, wherein, to upsample the second set of downsampled values in the quantization matrix, the one or more processors are configured to replicate a downsampled value in the second set of downsampled values for a number of the second set of values, wherein the number of the second set of values is determined from the second upsampling factor; and inverse quantize a block of transform coefficients with the first and second sets of values.

29. The method of claim 1, wherein filtering the number of quantization matrix values in the second set of values comprises averaging the number of quantization matrix values in the second set of values.

* * * * *